(12) United States Patent
Takami et al.

(10) Patent No.: US 8,594,876 B2
(45) Date of Patent: Nov. 26, 2013

(54) DRIVING DEVICE FOR VEHICLE

(75) Inventors: Shigeki Takami, Anjo (JP); Masaki Yoshida, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 92 days.

(21) Appl. No.: 13/427,415

(22) Filed: Mar. 22, 2012

(65) Prior Publication Data

US 2012/0245774 A1 Sep. 27, 2012

(30) Foreign Application Priority Data

Mar. 25, 2011 (JP) ................................. 2011-068475

(51) Int. Cl.
*B60L 11/00* (2006.01)

(52) U.S. Cl.
USPC ............................................ 701/22; 903/906

(58) Field of Classification Search
USPC .............. 701/22; 903/902, 906–907; 307/9.1; 180/65.285
See application file for complete search history.

(56) References Cited

U.S. PATENT DOCUMENTS

| | | | |
|---|---|---|---|
| 5,788,006 A | 8/1998 | Yamaguchi | |
| 8,164,282 B2 * | 4/2012 | Okamura | 318/139 |
| 8,352,109 B2 * | 1/2013 | Tsuda et al. | 701/22 |
| 8,506,451 B2 * | 8/2013 | Takami et al. | 477/5 |
| 2009/0167234 A1 * | 7/2009 | Uechi | 318/800 |
| 2012/0226417 A1 * | 9/2012 | Nishikawa | 701/42 |
| 2013/0030637 A1 * | 1/2013 | Yamamoto et al. | 701/22 |

FOREIGN PATENT DOCUMENTS

| | | |
|---|---|---|
| JP | A-08-295140 | 11/1996 |
| JP | A-2010-076678 | 4/2010 |

OTHER PUBLICATIONS

Mar. 19, 2012 International Search Report issued in International Patent Application No. PCT/JP2012/054779 (with translation).

* cited by examiner

*Primary Examiner* — Yonel Beaulieu
(74) *Attorney, Agent, or Firm* — Oliff & Berridge, PLC

(57) ABSTRACT

A rotation speed controller performs a rotation speed control to allow the rotation speed of a first rotating electrical machine to be equal to a start up target value, when an internal combustion engine is started while a frictional engagement device is disengaged. An engagement controller controls a non-synchronization engagement of the frictional engagement device and allows the frictional engagement device to be in a direct engagement state when performing the rotation speed control. A start up instruction unit gives a start up instruction with respect to the internal combustion engine on condition of being directly engaged. The rotation speed controller sets the start up target value so that a rotation speed at the time of a direct connection, which is a rotation speed of the engine while in direct engagement, becomes a start up rotation speed that is set within a startable rotation speed range of the engine.

20 Claims, 21 Drawing Sheets

DRIVING DEVICE FOR VEHICLE

INCORPORATION BY REFERENCE

The disclosure of Japanese Patent Application No. 2011-068475 filed on Mar. 25, 2011, including the specification, drawings and abstract thereof, is incorporated herein by reference in its entirety.

BACKGROUND OF THE INVENTION

1. Field of the Invention

The present invention relates to a driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device.

2. Description of the Related Art

For example, a technology disclosed in JP-A-2010-76678 may be exemplified as a driving device for a vehicle as described above in the related art. JP-A-2010-76678 discloses a configuration in which the differential gear unit includes a planetary gear mechanism having three rotational elements, the first rotating electrical machine is connected in a driving manner to a sun gear, the input member is connected in a driving manner to a carrier, and the second rotating electrical machine and the output member are connected in a driving manner to a ring gear. In addition, the driving device for a vehicle includes a frictional engagement device that is capable of releasing the connection in a driving manner between the carrier and the input member (internal combustion engine), such that the internal combustion engine is detachable by making the frictional engagement device be in a released state, during executing an electric traveling mode in which a vehicle is made to travel by torque of the second rotating electrical machine in a state in which the internal combustion engine is stopped. Therefore, during executing the electric traveling mode, the rotation speed of the sun gear (the first rotating electrical machine) or the carrier may be set independently from a vehicle speed. As a result, for example, as disclosed in JP-A-2010-76678, the carrier is made to rotate by actively controlling the rotation speed of the first rotating electrical machine, and auxiliary machines may be driven using the rotation of the carrier.

However, in a configuration in which the frictional engagement device is made to be the released state during executing the electric traveling mode like the configuration of JP-A-2010-76678, when it is switched to a split traveling mode in which the traveling is performed by using torque of the internal combustion engine due to an increase in torque required to a vehicle, or the like, it is necessary to switch an engagement state of the frictional engagement device to a direct engagement state, and to increase the rotation speed of the internal combustion engine to a rotation speed at which ignition is possible. In regard to a control at this time, paragraphs 0073 to 0076 of JP-A-2010-76678 discloses a configuration in which the frictional engagement device is switched from the released state to the direct engagement state in a state in which the rotation speed of the first rotating electrical machine is made to decrease until the rotation speed of the carrier is equal to zero that is a rotation speed of the internal combustion engine, and then the rotation speed of the first rotating electrical machine is made to increase until the rotation speed of the internal combustion engine becomes a rotation speed higher than a rotation speed at which ignition is possible. That is, in the configuration disclosed in JP-A-2010-76678, it is necessary that the frictional engagement device is made to engage after the rotation speed of the first rotating electrical machine is made to decrease until it reaches a state indicated by a bold broken line shown in FIG. 9 of JP-A-2010-76678, and then the rotation speed of the first rotating electrical machine is made to increase until it reaches a state indicated by a bold solid line shown in FIG. 9 of JP-A-2010-76678.

However, in the above-described configuration, in a case where an internal combustion engine starting up condition under which the internal combustion engine is started up is established (particularly, when it is determined that the switching from the electric traveling mode to the split traveling mode in JP-A-2010-76678), it is necessary to change the rotation speed of the first rotating electrical machine until the rotation speed of the internal combustion engine reaches a rotation speed at which the ignition is possible, after the frictional engagement device is made to be the direct engagement state. Therefore, there is a concern in that time is necessary to some degree until the internal combustion engine is started up after the starting up condition of the internal combustion engine is established.

SUMMARY OF THE INVENTION

Therefore, it is preferable to realize a driving device for a vehicle, which is capable of reducing time taken until an internal combustion engine is started up after a starting up condition of the internal combustion engine is established.

According to the invention, there is provided a driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device. The driving device for a vehicle is characterized in that: the input member, the output member, and the first rotating electrical machine are connected in a driving manner to the rotational elements, which are different from each other, of the differential gear unit, not through another rotational element of the differential gear unit; the second rotating electrical machine is connected in a driving manner to one of the rotational elements of the differential gear unit other than the rotational element to which the first rotating electrical machine is connected in a driving manner, not through another rotational element of the differential gear unit; the driving device includes a frictional engagement device that is capable of releasing the connection in a driving manner between any of the input member, the output member, and the first rotating electrical machine, and the rotational elements of the differential gear unit; the control device includes a rotation speed control unit that sets a starting up target value that is a target value of rotation speed of the first rotating electrical machine and performs a rotation speed control to allow the rotation speed of the first rotating electrical machine to be equal to the starting up target value, when the frictional engagement device enters a released state and an internal combustion engine starting up condition, under which the internal combustion engine is started up from a state in which the internal combustion engine is stopped, is established, an engagement control unit that performs a non-synchronization engagement control that allows the frictional engagement device to engage, in a non-synchronization state in which a difference in the rotation speed between the two engagement members, which engage with each other, of the frictional engagement device is equal to or greater than a threshold value of a differential rotation, on condition of the performing of rotation speed control, and that allows the frictional engagement device to be a direct engagement state that is an engagement state in which the differential rotation is not present between the two engagement members, and a starting up instruction unit that gives a starting up instruction with respect to the internal combustion engine on condition of being in the direct engagement state; the rotation speed control unit sets the starting up target value in such a manner that a rotation speed at the time of a direct connection, which is a rotation speed of the internal combustion engine at the time of being in the direct engagement state, becomes a starting up rotation speed that is set within a startable rotation speed range that is a rotation speed range in which the internal combustion engine may be started up.

In the present application, "connected in a driving manner" represents a state in which two rotational elements are connected in such a manner that a driving power may be transmitted, and is used as a concept including a state in which the two rotational elements are connected to integrally rotate, or a state in which the two rotational elements are connected in such a manner that the driving power may be transmitted through one or two or more power transmission members. These power transmission members include various members that transmit rotation with the same speed or after converting the speed thereof, for example, a shaft, a gear mechanism, a belt, a chain, or the like may be exemplified. In addition, as these power transmission members, an engagement element, which selectively transmits the rotation and a driving power, for example, a frictional engagement element, a gear engagement type engagement element, or the like may be included. In addition "driving force" is used with the same meaning as "torque".

In addition, in the present application, a differential gear mechanism including three rotational elements, for example, a planetary gear mechanism including a sun gear, a carrier, and a ring gear is used, a unit, which is obtained by the differential gear mechanism alone or by a composition of a plurality of differential gear mechanisms, is referred to as a differential gear unit.

In addition, in the present application, "rotating electrical machine" is used as a concept to include a motor (an electric motor), a generator (an electricity generator), and a motor and generator performing the functions of both the motor and generator as necessary.

According to the above-described characteristic configuration, since the rotation speed of the internal combustion engine when the frictional engagement device becomes the direct engagement state becomes a rotation speed at which the internal combustion engine may be started up, it is possible to quickly give a starting up instruction with respect to the internal combustion engine without changing the rotation speed of the first rotating electrical machine after the frictional engagement device is made to be the direct engagement state. Therefore, it is possible to shorten time taken until the internal combustion engine is started up after the internal combustion engine starting up condition is established compared to a case where it is necessary to change the rotation speed of the first rotating electrical machine after the frictional engagement device is made to be the direct engagement state.

Here, the starting up rotation speed may be set to a rotation speed at which the internal combustion engine may output internal combustion engine request torque that is necessary for the internal combustion engine to allow a vehicle to travel.

According to this configuration, it is possible to shorten time taken until the internal combustion engine is started up after the internal combustion engine starting up condition is established, and it is possible to quickly output torque corresponding to a request of a driver from the internal combustion engine to the output member. Therefore, it is possible to realize the torque requested by the driver with good response, for example, in the case of accelerating a vehicle, or the like.

In addition, the rotation speed control unit may set the starting up target value based on a rotation speed of the output member, the starting up rotation speed, and a gear ratio of the differential gear unit.

According to this configuration, it is possible to appropriately set the starting up target value in response to a vehicle speed, and therefore it is possible to relatively reliably shorten time taken until the internal combustion engine is started up after the internal combustion engine starting up condition is established.

In addition, in a case where a rotation speed when the starting up condition is established, which is the rotation speed of the first rotating electrical machine when the internal combustion engine starting up condition is established, is included in the rotation speed range of the first rotating electrical machine, which is to make the rotation speed at the time of direct connection be within the startable rotation speed range, the rotation speed control unit may set the rotation speed when the starting up condition is established as the starting up target value.

According to this configuration, in a case where the rotation speed when the starting up condition is established is included in the rotation speed range of the first rotating electrical machine, which is to make the rotation speed at the time of direct connection be within the startable rotation speed range, it is possible to give a starting up instruction to the internal combustion engine in a state in which the frictional engagement device is in the direct engagement state without changing the rotation speed of the first rotating electrical machine after the internal combustion engine starting up condition is established. Therefore, for example, in a case where the above-described condition is established due to a high vehicle speed, or the like, it is possible to further shorten time taken until the internal combustion engine is started up after the internal combustion engine starting up condition is established.

In addition, in a case where the internal combustion engine request torque, which is necessary for the internal combustion engine to allow a vehicle to travel, is less than a request determination threshold value that is determined in advance, the rotation speed control unit may set a rotation speed of the first rotating electrical machine, which allows a synchronization state in which the difference in the rotation speed between the two engagement members is less than the differential rotation threshold value, as the starting up target value, regardless of the starting up rotation speed, the engagement control unit may perform a synchronization engagement control to allow the frictional engagement device to engage in the synchronization state, instead of the non-synchronization engagement control, and allows the frictional engagement device to be the direct engagement state, and the starting up instruction unit may change the rotation speed of the first rotating electrical machine with a rotation speed of the first rotating electrical machine, which allows the rotation speed of the internal combustion engine to be within the startable rotation speed range, made as a target value, and then may give a starting up instruction with respect to the internal combustion engine.

In a case where the torque requested to the internal combustion engine is small, a request for quickly starting up the internal combustion engine generally becomes low, compared to a case where the torque is large. According to the above-described configuration, it is possible to suppress that the starting up control of the internal combustion engine, which is accompanied with the non-synchronization engagement control, is performed more often than necessary, in appropriate consideration of a degree of request with respect to shortening of time taken until the internal combustion engine is started up after the internal combustion engine starting up condition is established. Therefore, it is possible to quickly start up the internal combustion engine in a case where a high responsiveness is required, while appropriately securing durability of the frictional engagement device.

In addition, as the non-synchronization engagement control, the engagement control unit may reduce the difference in the rotation speed between the two engagement members in a slip engagement state in which the two engagement members engage with each other with the difference in the rotation speed present therebetween, and may perform a control to allow the direct engagement state on condition of being in the synchronization state in which the difference in the rotation speed between the two engagement members is less than the differential rotation threshold value.

According to this configuration, it is possible to suppress that an engagement shock occurs at the time of performing the non-synchronization engagement control.

In addition, the second rotating electrical machine may be connected in a driving manner to the rotational element, to which the output member is connected in a driving manner, of the differential gear unit, not through another rotational element of the differential gear unit.

According to this configuration, even when a member in which the connection in a driving manner with the rotational element of the differential gear unit may be released by the frictional engagement device is set to any of the input member, the output member, and the first rotating electrical machine, it is possible to realize the electric traveling mode in which the torque of the second rotating electrical machine is transmitted to the output member to drive wheels in a state in which the internal combustion engine is stopped. Therefore, a degree of freedom in design with respect to disposition of the frictional engagement device may increase, such that it is possible to broadly apply the driving device for a vehicle according to the invention.

For example, as a configuration that is provided to the frictional engagement device so as to realize the release of the connection in a driving manner between the input member and the rotational element of the differential gear unit, the differential gear unit may include three rotational elements that are a first rotational element, a second rotational element, and a third rotational element in the order of rotation speed, the first rotating electrical machine may be connected in a driving manner to the first rotational element, the input member may be connected in a driving manner to the second rotational element, and the second rotating electrical machine and the output member may be connected in a driving manner to the third rotational element, not through another rotational element of the differential gear unit, and the frictional engagement device may be provided in a power transmission path between the input member and the second rotational element.

In addition, "order of rotation speed" may be either an order from the high speed side to the low speed side or an order from the low speed side to the high speed side, and may be any of the orders depending on a rotation state of each differential gear mechanism, but in any of these cases, the order of the rotational elements is not changed.

In addition, the second rotating electrical machine may be connected in a driving manner to the rotational element of the differential gear unit other than the rotational element to which the first rotating electrical machine is connected in a driving manner and the rotational element to which the output member is connected in a driving manner, not though another rotational element of the differential gear unit, and the frictional engagement device may be provided in a power transmission path between the input member and the rotational element, to which the input member is connected in a driving manner not through another rotational element, of the differential gear unit.

According to this configuration, it is possible to realize the electric traveling mode in which the torque of the second rotating electrical machine is transmitted to the output member so as to drive the wheels in a state in which the internal combustion engine is stopped.

DETAILED DESCRIPTION OF THE EMBODIMENTS

1. First Embodiment

Figure 1:
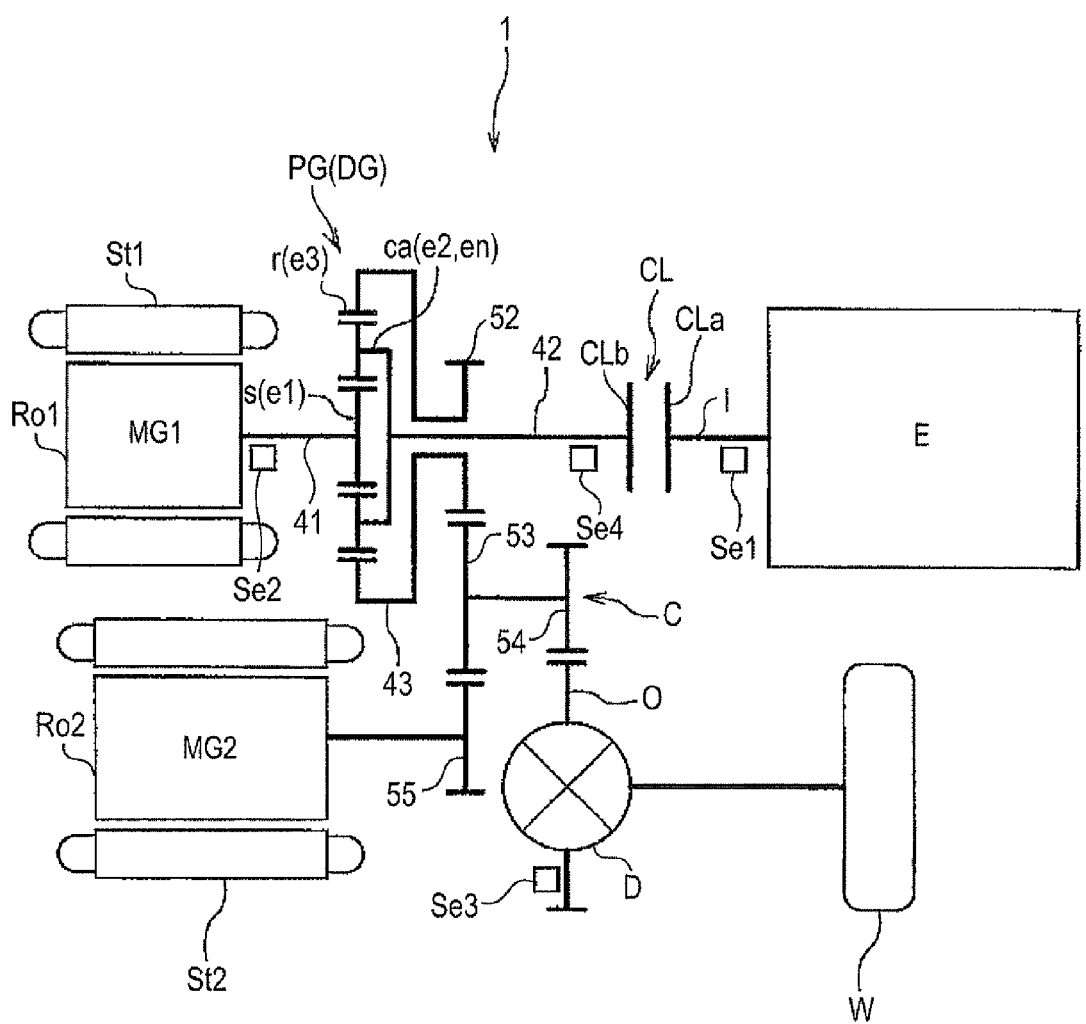
FIG. 1 is a skeleton diagram illustrating a mechanical configuration of a driving device for a vehicle according to a first embodiment of the invention.

A first embodiment of a driving device for a vehicle according to the invention will be described with reference to the attached drawings. As shown in FIG. 1, the driving device 1 for a vehicle according to this embodiment is configured by a driving device (driving device for a hybrid car) to drive a vehicle (a hybrid car) including both an internal combustion engine E and rotating electrical machines MG1 and MG2 as a driving power source for wheels. In addition, the driving device 1 for a vehicle according to this embodiment includes a control device 70 (refer to FIG. 2) and this control device 70 controls an operation of each driving power source and a frictional engagement device CL based on a system configuration shown in FIG. 2. In addition, in FIG. 2, broken lines represent transmission paths of electric power, and solid line arrows represent transmission paths of various pieces of information.

As shown in FIG. 1, in this embodiment, a differential gear unit DG, which is provided to the driving device 1 for a vehicle, is configured by a planetary gear mechanism PG including a sun gear s, a carrier ca, and a ring gear r as rotational elements. In addition, a first rotating electrical machine MG1 is connected in a driving manner to the sun gear s, an input member I is connected in a driving manner to the carrier ca, and a second rotating electrical machine MG2 and an output member O are connected in a driving manner to the ring gear r not through another rotational element of the planetary gear mechanism PG. In addition, the input member I is connected in a driving manner to the internal combustion engine E, and the output member O is connected in a driving manner to wheels W.

In addition, the driving device 1 for a vehicle includes a frictional engagement device CL that is capable of releasing the connection in a driving manner between the input member I and the carrier ca. Here "releasing of the connection in a driving manner" represents that the connection state between the two rotational elements that are connected in a driving manner is changed into a state (non-connection state) in which the transmission of the driving power is not performed between the two rotational elements. Therefore, when performing an electric traveling mode (EV traveling mode) in which output torque of the second rotating electrical machine MG2 is transmitted to the output member O to drive the wheels W in a state in which the internal combustion engine E is stopped, the internal combustion engine E may be detached, such that an improvement in energy efficiency due to avoiding of idling (dragging) of the first rotating electrical machine MG1, a driving of an auxiliary machine (for example, an oil pump or the like) by using rotation of the carrier ca, or the like may be realized. Hereinafter, a configuration of the driving device 1 for a vehicle according to this embodiment will be described in detail.

1-1. Mechanical Configuration of Driving Device for Vehicle

First, a mechanical configuration of the driving device 1 for a vehicle according to this embodiment will be described. The driving device 1 for a vehicle includes the input member I that is connected in a driving manner to the internal combustion engine E, the output member O that is connected in a driving manner to the wheels W, the first rotating electrical machine MG1, the second rotating electrical machine MG2, and the differential gear unit DG including at least three rotational elements, and a control device 70. In addition, the driving device 1 for a vehicle according to this embodiment is configured by a so-called two-motor split type driving device for a hybrid car, which includes the differential gear unit DG for power distribution that distributes the output torque of the internal combustion engine E to the first rotating electrical machine MG1 side, the wheels W, and the second rotating electrical machine MG2 side.

As shown in FIG. 1, in this embodiment, the differential gear unit DG is configured by a single pinion type planetary gear mechanism PG. That is, the differential gear unit DG includes three rotational elements in this example. In addition, when it is assumed that in the order of rotation speed (that is, in the order of disposition in a speed diagram (collinear diagram)), these three rotational elements are set in the order of a first rotational element e1, a second rotational element e2, and a third rotational element e3, in this embodiment, the sun gear s of the planetary gear mechanism PG makes up the first rotational element e1, the carrier ca of the planetary gear mechanism PG makes up the second rotational element e2, and the ring gear r of the planetary gear mechanism PG makes up the third rotational element e3.

As described below, the input member I, the output member O, and the first rotating electrical machine MG1 are connected in a driving manner to the rotational elements, which are different from each other, of the differential gear unit DG, not through another rotational element of the differential gear unit DG. In addition, the second rotating electrical machine MG2 is connected in a driving manner to one of the rotational elements of the differential gear unit DG other than the rotational element to which the first rotating electrical machine MG1 is connected in a driving manner, not through another rotational element of the differential gear unit DG. In addition, the driving device 1 for a vehicle includes the frictional engagement device CL that is capable of releasing the connection in a driving manner between any of the input member I, the output member O, and the first rotating electrical machine MG1, and the rotational elements of the differential gear unit DG.

In addition, a rotational element connecting member that rotates integrally with the rotational element is connected to each of the rotational elements of the differential gear unit DG. Specifically, as shown in FIG. 1, a first rotational element connecting member 41 is connected to the sun gear s as the first rotational element e1, a second rotational element connecting member 42 is connected to the carrier ca as the second rotational element e2, and a third rotational element connecting member 43 is connected to the ring gear r as the third rotational element e3. In addition, each of the input member I, the output member O, the first rotating electrical machine MG1, and the second rotating electrical machine MG2 is connected in a driving manner to any of the rotational element connecting members, and thereby is connected in a driving manner to any of the rotational elements of the differential gear unit DG.

The input member I is connected in a driving manner to the internal combustion engine E. In this embodiment, the input member I is configured by a shaft member (input shaft). Here, the internal combustion engine E is a motor that outputs power by combustion of a fuel, and may use, for example, a spark ignition engine such as a gasoline engine, a compression ignition engine such as a diesel engine, or the like. The input member I is connected in a driving manner to an output shaft of the internal combustion engine, for example, a crank shaft of the internal combustion engine E or the like. In this embodiment, the input member I is connected in a driving manner to the output shaft of the internal combustion engine to rotate integrally therewith, such that a rotation speed of the input member I becomes equal to that of the internal combustion engine E. In addition, the internal combustion engine E may be appropriately connected in a driving manner to the input member I through another device such as a damper and a fly wheel.

The output member O is connected in a driving manner to the wheels W. In this embodiment, the output member O is configured by a gear member, and specifically, is configured by a differential input gear that is provided to a differential gear unit D for output. In this example, the differential gear unit D for output is configured by a differential gear mechanism using a plurality of bevel gears that engage with each other, and the torque transmitted to the output member O is distributed to left and right wheels W that serve as driving wheels.

The first rotating electrical machine MG1 includes a first stator St1 that is fixed to a casing (not shown), and a first rotor Ro1 that is rotatably supported at an inner side in a radial direction of the first stator St1. The second rotating electrical machine MG2 includes a second stator St2 that is fixed to a casing (not shown), and a second rotor Ro2 that is rotatably supported at an inner side in a radial direction of the second stator St2. The second rotor Ro2 is connected in a driving manner to a second rotating electrical machine output gear 55 to rotate integrally therewith through a second rotor shaft to which the second rotor Ro2 is fixed.

Figure 2:
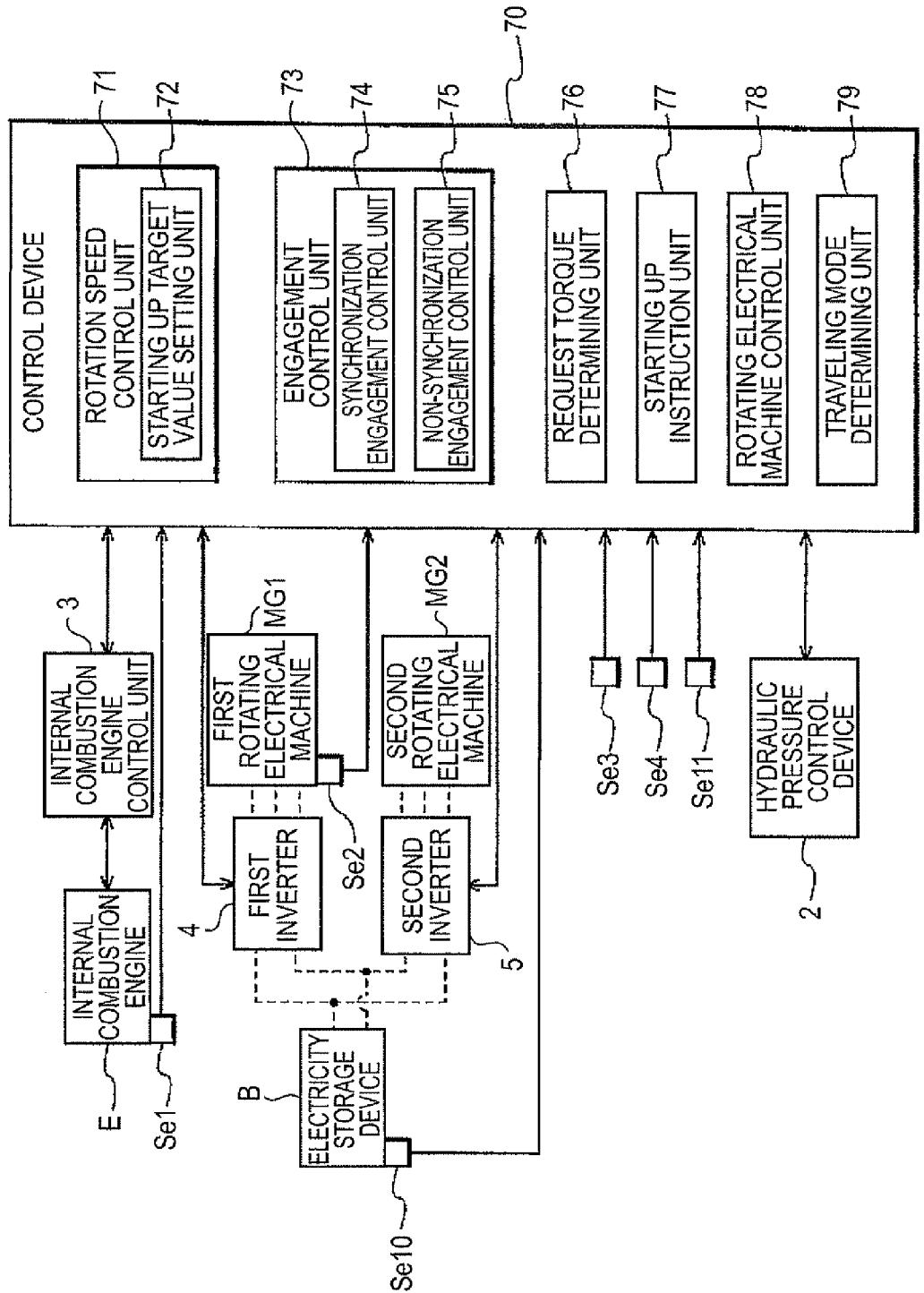
FIG. 2 is a schematic diagram illustrating a system configuration of the driving device for a vehicle according to the first embodiment of the invention.

As shown in FIG. 2, the first rotating electrical machine MG1 is electrically connected to an electricity storage device B through a first inverter 4, and the second rotating electrical machine MG2 is electrically connected to the electricity storage device B through a second inverter 5. As the electricity storage device B, various well known electricity storage devices such as a battery and a capacitor may be used. In addition, in this embodiment, each of the first rotating electrical machine MG1 and the second rotating electrical machine MG2 may perform a function as a motor (electric motor) to which electric power is supplied from the electricity storage device B and which generates power (torque), and a function as a generator (electricity generator) to which the power is supplied to generate the electricity power, and which supplies the generated electricity power to the electricity storage device B.

The frictional engagement device CL is a device that includes two engagement members, and that selectively driving-connects a member connected in a driving manner to a first engagement member CLa that is one engagement member and a member connected in a driving manner to a second engagement member CLb that is the other engagement member. In this embodiment, the frictional engagement device CL is configured by a wet-type multi-plate clutch that operates by hydraulic pressure. In addition, in this embodiment, the frictional engagement device CL is provided in such a manner that the frictional engagement device CL can release the connection in a driving manner between the input member I and the rotational element (in this example, the second rotational element e2) of the differential gear unit DG. That is, in this embodiment, the frictional engagement device CL is provided in a power transmission path between the input member I and the rotational element (in this example, the second rotational element e2) of the differential gear unit DG. In addition, the first engagement member CLa serves as an input side engagement member that is connected in a driving manner to the input member I to rotate integrally therewith, and the second engagement member CLb serves as an output side engagement member that is connected in a driving manner to the second rotational element connecting member 42 so as to rotate integrally therewith.

In addition, as shown in FIG. 1, in this embodiment, the first rotating electrical machine MG1 is connected in a driving manner to the sun gear s (the first rotational element e1), the input member I is connected in a driving manner to the carrier ca (the second rotational element e2), and the second rotating electrical machine MG2 and the output member O are connected in a driving manner to the ring gear r (the third rotational element e3), not through another rotational element of the planetary gear mechanism PG (differential gear unit DG). That is, in this embodiment, the second rotating electrical machine MG2 is connected in a driving manner to the ring gear r (the third rotational element e3) that is the rotational element, to which the output member O is connected in a driving manner, of the differential gear unit DG, not through another rotational element of the differential gear unit DG.

Specifically, the first rotor shaft to which the first rotor Ro1 is fixed is connected in a driving manner to the first rotational element connecting member 41 to rotate integrally therewith, such that first rotating electrical machine MG1 is connected in a driving manner to the sun gear s. That is, in this embodiment, the rotation speed of the sun gear s (the first rotational element e1) is always equal to that of the first rotor Ro1 (the first rotating electrical machine MG1).

The input member I is connected in a driving manner with respect to the first engagement member CLa of the frictional engagement device CL to rotate integrally therewith, and thereby is selectively connected in a driving manner to the carrier ca through the frictional engagement device CL. Here, "selectively connected in a driving manner" represents that a state of transmitting a driving power between two rotational elements that are connected in a driving manner is selectively realized. That is, in this embodiment, in a case where the frictional engagement device CL is in a direct engagement state, the rotation speed of the carrier ca (the second rotational element e2) becomes equal to that of the input member I (the internal combustion engine E). In addition, in this embodiment, a difference in the rotation speed between the two engagement members of the frictional engagement device CL becomes a difference between the rotation speed of the input member I (the internal combustion engine E) and the rotation speed of the carrier ca (the second rotational element connecting member 42).

The second rotating electrical machine MG2 and the output member O are connected in a driving manner to the ring gear r through a counter gear mechanism C. As shown in FIG. 1, the counter gear mechanism C includes a first counter gear 53, a second counter gear 54, and a counter shaft that connects these counter gears in order for these counter gears to rotate integrally with each other. The third rotational element connecting member 43 includes a counter drive gear 52 that engages with the first counter gear 53. In addition, the second rotating electrical machine output gear 55 is disposed to engage with the first counter gear 53 at a position in which a peripheral direction (a peripheral direction of the first counter gear 53) is different from that of the counter drive gear 52, such that the second rotating electrical machine MG2 is connected in a driving manner to the ring gear r. In addition, the output member O is disposed to engage with the second counter gear 54, and thereby is connected in a driving manner to the ring gear r. That is, in this embodiment, the rotation speeds of the ring gear r, the second rotating electrical machine MG2, and the output member O are proportional to each other, and a proportionality coefficient (that is, a ratio of rotation speeds) thereof becomes a value corresponding to dimensions of a gear interposed therebetween.

When including the above-described configurations, the driving device 1 for a vehicle is provided with a hybrid traveling mode (split traveling mode) in which traveling is performed with both output torque of the internal combustion engine E and output torque of the rotating electrical machines MG1 and MG2, and an electric traveling mode (EV traveling mode) in which traveling is performed by only the output torque of the rotating electrical machines MG1 and MG2 (in this example, by only the second rotating electrical machine MG2). In the hybrid traveling mode, the frictional engagement device CL becomes a direct engagement state, and the output torque of the internal combustion engine E is distributed to the sun gear s (the first rotating electrical machine MG1) and the ring gear r (the counter drive gear 52) by the planetary gear mechanism PG. In the EV traveling mode, the frictional engagement device CL enters a released state, and the internal combustion engine E becomes a stopped state. In addition, the rotation speed of the output shaft (the input member I) of the internal combustion engine basically becomes zero by a frictional force inside the internal combustion engine E, and the rotation speed of the first rotating electrical machine MG1 is controlled to be basically zero.

1-2. System Configuration of Driving Device for Vehicle
1-2-1. Overall Configuration of System A system configuration of the driving device 1 for a vehicle will be described. As shown in FIG. 2, the control device 70 according to this embodiment includes a traveling mode determining unit 79, a rotating electrical machine control unit 78, a rotation speed control unit 71, an engagement control unit 73, a request torque determining unit 76, and a starting up instruction unit 77.

In addition, the control device 70 includes an arithmetic operation processing unit such as a CPU as a basic configuration, a memory device such as a RAM and a ROM, or the like. In addition, respective functional units of the control device 70 are configured by software (program) stored in the ROM or the like or hardware such as an arithmetic operation circuit that is separately provided, or both software and hardware. The respective functional units described above are configured so as to transmit and receive information to and from each other.

The control device 70 is configured to acquire information from a sensor or the like provided at each portion of a vehicle so as to acquire information of each portion of the vehicle in which the driving device 1 for a vehicle is mounted. Specifically, as shown in FIG. 2, the control device 70 is configured to acquire information from an input member sensor Se1, an output member sensor Se3, an accelerator opening degree sensor Se11, a first rotor shaft sensor Se2, a sensor Se4 for a rotational element that is an object to be released, and an electricity storage state sensor Se10.

The input member sensor Se1 is a sensor that detects the rotation speed of the input member I. The rotation speed of the input member I, which is detected by the input member sensor Se1 is equal to the rotation speed of the internal combustion engine E in this example. The output member sensor Se3 is a sensor that detects the rotation speed of the output member O. The control device 70 derives a vehicle speed based on the rotation speed of the output member O, which is detected by the output member sensor Se3. The accelerator opening degree sensor Se11 is a sensor that detects an accelerator opening degree by detecting an amount of operation of an accelerator pedal (not shown).

The first rotor shaft sensor Se2 is a sensor that detects the rotation speed of the first rotating electrical machine MG1 (the first rotor shaft), and in this example, the rotation speed of the first rotating electrical machine MG1, which is detected by the first rotor shaft sensor Se2, is equal to the rotation speed of the first rotational element connecting member 41 (the sun gear s). The first rotor shaft sensor Se2 may be, for example, a rotation sensor (resolver or the like) provided to the first rotating electrical machine MG1.

The sensor Se4 for a rotational element that is an object to be released is a sensor that detects the rotation speed of the rotational element en, which is an object to be released, among the rotational elements provided to the differential gear unit DG. Here, the rotational element en that is an object to be released is a rotational element in which the connection in a driving manner with any of the input member I, the output member O, and the first rotating electrical machine MG1 may be released by the frictional engagement device CL. In this embodiment, the carrier ca is the rotational element en that is an object to be released, and the sensor Se4 for a rotational element that is an object to be released detects the rotation speed of the second rotational element connecting member 42.

The electricity storage state sensor Se10 is a sensor that detects a state (in this example, a temperature and an amount of electricity storage) of the electricity storage device B. In this embodiment, the electricity storage state sensor Se10 includes a voltage sensor, a current sensor, or the like, and detects the amount of electricity storage by detecting an SOC (state of charge). In addition, the electricity storage state sensor Se10 includes a temperature sensor, and detects a temperature of the electricity storage device B.

As shown in FIG. 2, the vehicle is provided with an internal combustion engine control unit 3. The internal combustion engine control unit 3 performs an operation control of the internal combustion engine E by controlling each portion of the internal combustion engine E. Specifically, the internal combustion engine control unit 3 sets target torque and a target rotation speed as control targets of the output torque and the rotation speed of the internal combustion engine E, and performs an operation control of the internal combustion engine E by operating the internal combustion engine E in correspondence with the control targets. In addition, the target torque and the target rotation speed are set based on an instruction from the control device 70. In addition, in a state in which the internal combustion engine E is stopped, when receiving a starting up instruction from the control device 70, the internal combustion engine control unit 3 starts fuel injection and ignition to change the internal combustion engine E into a started up state. In addition, in a started up state of the internal combustion engine E, when receiving a stop instruction from the control device 70, the internal combustion engine control unit 3 stops the fuel injection and the ignition to change the internal combustion engine E into a stopped state.

1-2-2. Configuration of Traveling Mode Determining Unit

The traveling mode determining unit 79 is a functional unit that determines a traveling mode of the vehicle. The traveling mode determining unit 79 determines a traveling mode which the driving device 1 for a vehicle realizes based on a vehicle speed derived based on the detection result of the output member sensor Se3, the accelerator opening degree detected by the accelerator opening degree sensor Se11, and the electricity storage state (the amount of electricity storage, the temperature, or the like) detected by the electricity storage state sensor Se10. In this embodiment, the traveling mode, which may be determined by the traveling mode determining unit 79, includes the electric traveling mode and the hybrid traveling mode. In addition, basically, the traveling mode determining unit 79 determines the traveling mode with reference to a mode selection map (not shown) that defines a relationship between the traveling mode, and the vehicle speed, the accelerator opening degree, and the electricity storage state that are stored in the memory device configured by a memory or the like.

According to this mode selection map, in a case where an internal combustion engine starting up condition is established during traveling in the electric traveling mode, it is determined to be transitioned to the hybrid traveling mode. Here, the internal combustion engine starting up condition is a condition to start up the internal combustion engine E in a stopped state, and is established in a case where a situation in which the vehicle needs the torque of the internal combustion engine E. For example, in a case where it becomes a state in which the torque, which is required for the vehicle, may not be obtained by only the rotating electrical machines MG1 and MG2, when a driver strongly pushes the accelerator pedal during traveling in the electric traveling mode or while the vehicle is stopped, or the like, the starting up condition of the internal combustion engine is established. In addition, the starting up condition of the internal combustion engine is also established in a case where the amount of electricity storage of the electricity storage device B decreases to a predetermined threshold value or less, such that it is necessary to start up the internal combustion engine E and to allow the rotating electrical machines MG1 and MG2 to generate electricity using the torque of the internal combustion engine E so as to charge the electricity storage device B.

1-2-3. Configuration of Rotating Electrical Machine Control Unit

The rotating electrical machine control unit 78 is a functional unit that performs an operation control of the first rotating electrical machine MG1 or the second rotating electrical machine MG2. Specifically, the rotating electrical machine control unit 78 sets target torque and a target rotation speed as control targets of the output torque and the rotation speed of the first rotating electrical machine MG1, and controls the first inverter 4 so that the first rotating electrical machine MG1 operates in correspondence with the control targets. In this example, the rotating electrical machine control unit 78 performs the operation control of the first rotating electrical machine MG1 by a torque control or a rotation speed control. Here, the torque control is a control in which target torque with respect to the first rotating electrical machine MG1 is set, and the output torque of the first rotating electrical machine MG1 is made to approach (follow) the target torque. In addition, the rotation speed control is a control in which a target rotation speed with respect to the first rotating electrical machine MG1 is set, and the output torque of the first rotating electrical machine MG1 is controlled to make the rotation speed of the first rotating electrical machine MG1 approach (follow) the target rotation speed. In addition, a control with respect to the second rotating electrical machine MG2 is the same as the first rotating electrical machine MG1 except that the first inverter 4 is transitioned to the second inverter 5.

1-2-4. Configuration of Request Torque Determining Unit

The request torque determining unit 76 is a functional unit that determines vehicle request torque. Here, the vehicle request torque is torque that is requested for a driving power source (in this example, the internal combustion engine E and the rotating electrical machines MG1 and MG2) from a vehicle side, and includes torque that is necessary to realize a motion corresponding to an artificial operation (for example, an operation of an accelerator) of a driver, torque (for example, torque to charge up the electricity storage device B) that is necessary to maintain a traveling performance of a vehicle, or the like. That is, the vehicle request torque is torque that is necessary to allow a vehicle to travel. The request torque determining unit 76 determines the vehicle request torque with reference to a predetermined map (not shown) based on a vehicle speed derived based on the detection result (a rotation speed of the output member O) of the output member sensor Se3, and the detection result (an accelerator opening degree) of the accelerator opening degree sensor Se11. In addition, the request torque determining unit 76 determines the vehicle request torque also based on the electricity storage state of the electricity storage device B, which is detected by the electricity storage state sensor Se10, as necessary, in addition to the vehicle speed and the accelerator opening degree.

The request torque determining unit 76 determines the internal combustion engine request torque based on the vehicle request torque, and outputs information of the internal combustion engine request torque to the internal combustion engine control unit 3. The internal combustion engine request torque is torque requested for the internal combustion engine E, in other words, torque that is necessary for the internal combustion engine E to allow a vehicle to travel. In addition, the internal combustion engine control unit 3 sets target torque and a target rotation speed with respect to the internal combustion engine E based on the internal combustion engine request torque, and performs an operation control of the internal combustion engine E.

In addition, the request torque determining unit 76 determines first rotating electrical machine request torque or second rotating electrical machine request torque based on the vehicle request torque, and outputs information of this first rotating electrical machine request torque or second rotating electrical machine request torque to the rotating electrical machine control unit 78. The first rotating electrical machine request torque is torque that is requested for the first rotating electrical machine MG1, in other words, output torque necessary for the first rotating electrical machine MG1 to allow a vehicle to travel. Similarly, the second rotating electrical machine request torque is torque requested for the second rotating electrical machine MG2, in other words, output torque necessary for the second rotating electrical machine MG2 to allow a vehicle to travel. In addition, the rotating electrical machine control unit 78 sets target torque and a target rotation speed with respect to the first rotating electrical machine MG1 or the second rotating electrical machine MG2 based on these first rotating electrical machine request torque and second rotating electrical machine request torque, and performs a control of the first rotating electrical machine MG1 and the second rotating electrical machine MG2.

1-2-5. Configuration of Rotation Speed Control Unit

The rotation speed control unit 71 is a functional unit that performs a rotation speed control to allow the rotation speed of the first rotating electrical machine MG1 to be equal to the starting up target value Ni in a case where the internal combustion engine starting up condition is established, which starts up the internal combustion engine E from a state in which the frictional engagement device CL is a released state and the internal combustion engine E is stopped (hereinafter, referred to as a "released and stopped state). For example, in a case where a transition to a hybrid traveling mode is determined by the traveling mode determining unit 79 during traveling in an electric traveling mode, the rotation speed control unit 71 performs a rotation speed control.

In this embodiment, the rotation speed control by the rotation speed control unit 71 is performed through the rotating electrical machine control unit 78. Specifically, the rotating electrical machine control unit 78 sets the starting up target value Ni as the target rotation speed, and performs the rotation speed control of the first rotating electrical machine MG1 by a rotation speed feedback control, based on a difference between the target rotation speed and a real rotation speed of the first rotating electrical machine MG1, which is detected by the first rotor shaft sensor Se2. In addition, the starting up target value Ni is a target value of the rotation speed of the first rotating electrical machine MG1 at the time of performing the rotation speed control, and is set by a starting up target value setting unit 72 provided to the rotation speed control unit 71. In addition, a configuration of the starting up target value setting unit 72 will be described in the following item of "1-2-8. Configuration of Starting Up Target Value Setting Unit".

Figure 3:
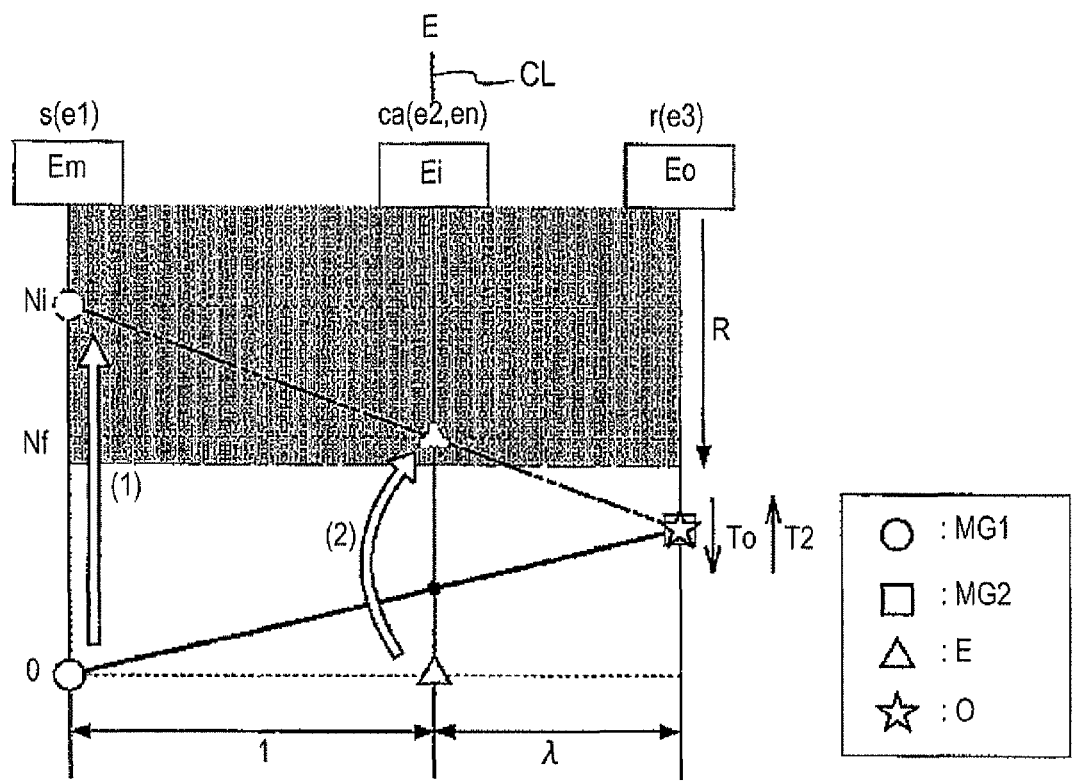
FIG. 3 is a speed diagram illustrating an operation of a first starting up preparation control according to the first embodiment of the invention.

The rotation speed control, which is performed in this embodiment, will be described with reference to FIG. 3. FIG. 3 shows a speed diagram illustrating an operation state of the differential gear unit DG (in this embodiment, a planetary gear mechanism PG). In this speed diagram, the vertical axis corresponds to a rotation speed of each of the rotational elements. That is, "0" described in correspondence with the vertical axis represents that the rotation speed is zero, and an upper side represents a positive rotation (the rotation speed is positive) and a lower side represents a negative rotation (the rotation speed is negative). In addition, each of a plurality of vertical lines arranged in parallel with each other corresponds to each rotational element of the differential gear unit DG. An interval between the vertical lines corresponding to respective rotational element corresponds to a gear ratio λ, of the differential gear unit DG. In this example, the differential gear unit DG is configured by the planetary gear mechanism. PG, and a gear ratio λ thereof becomes a dimensional ratio between the sun gear s and the ring gear r. In addition, "Em", "Ei", and "Eo", which are surrounded by a quadrilateral and are described at the upper sides of the respective vertical lines, represent a reaction force transmitting element Em, an input rotation element Ei, and an output rotation element Ho at the time of executing the hybrid traveling mode, respectively.

In addition, on the speed diagram, the rotation speed of the first rotating electrical machine MG1, the rotation speed of the second rotating electrical machine MG2, the rotation speed of the internal combustion engine E (the input member I), and the rotation speed of the output member O are represented by symbols different from each other, respectively. In addition, for the easy understanding of the invention, the rotation speed of each member of the first rotating electrical machine MG1, the second rotating electrical machine MG2, the internal combustion engine E, and the output member O represents a rotation speed after converting the rotation speed (gear changing) by a power transmission member (excluding an engagement element that selectively transmits rotation and torque like the frictional engagement device CL) that is provided at a power transmission path to the rotational element (rotational element connecting member) of the differential gear unit DG. The following description with respect to the rotation speed of each member basically represents a rotation speed after the converting of the rotation speed by the power transmission member.

Specifically, in this embodiment, since the first rotating electrical machine MG1 is connected in a driving manner to the first rotational element connecting member 41 to rotate integrally therewith, the rotation speed of the first rotating electrical machine MG1 (the sun gear s) in the speed diagram is equal to a real rotation speed of the first rotating electrical machine MG1. In addition, when being in a direct engagement state with respect to the frictional engagement device CL, the internal combustion engine E (the input member I) rotates at the same rotation speed as the second rotational element connecting member 42, such that the rotation speed of the internal combustion engine E (the carrier ca) in the speed diagram is equal to a real rotation speed of the internal combustion engine E.

On the other hand, since the second rotating electrical machine MG2 is connected in a driving manner to the third rotational element connecting member 43 through the counter gear mechanism C, the rotation speed of the second rotating electrical machine MG2 (the ring gear r) on the speed diagram becomes a value obtained by multiplying the real rotation speed of the second rotating electrical machine MG2 and a gear ratio of a power transmission system including the second rotating electrical machine output gear 55, the first counter gear 53, and the counter drive gear 52. Similarly, since the output member O is connected in a driving manner to the third rotational element connecting member 43 through the counter gear mechanism C, the rotation speed of the output member O on the speed diagram becomes a value obtained by multiplying the real rotation speed of the output member O and the gear ratio of the power transmission system including the differential input gear (the output member O), the second counter gear 54, the first counter gear 53, and the counter drive gear 52.

In addition, "T2" represents torque (second rotating electrical machine torque) that is transmitted from the second rotating electrical machine MG2 to the rotational element (in this example, the ring gear r) of the differential gear unit DG, and "To" represents torque (traveling torque, traveling resistance) that is transmitted from the output member O (wheels W) to the rotational element (in this example, the ring gear r) of the differential gear unit DG. In an arrow disposed near each torque, an upward arrow represents positive direction torque, and a downward arrow represents negative direction torque. In addition, in each speed diagram that is referred to in the following description, the operational state of the differential gear unit DG is illustrated similarly to FIG. 3. In addition, in FIG. 17 or the like that is referred to later, "T1" represents torque (first rotating electrical machine torque) that is transmitted from the first rotating electrical machine MG1 to the rotational element of the differential gear unit DG, In FIG. 3, a solid line represents an operational state in the electric traveling mode in which the frictional engagement device CL enters a released state, and the traveling is performed using only the output torque of the rotating electrical machines MG1 and MG2 (in this example, by only the second rotating electrical machine MG2). In this electric traveling mode, the second rotating electrical machine MG2 is controlled to output torque T2 of the second rotating electric machine in response to vehicle request torque that is determined based on a vehicle speed, an accelerator opening degree, or the like. FIG. 3 illustrates a case in which torque for accelerating or cruising a vehicle is required, and the second rotating electrical machine MG2 is powering while rotating in the positive direction against the traveling torque To that operates on the ring gear r in the negative direction to output the second rotating electrical machine torque T2 in the positive direction.

In the electric traveling mode, the frictional engagement device CL enters a released state, and the rotational element en, which is an object to be released, of the differential gear unit DG becomes a freely rotating state. In this embodiment, the rotational element en that is an object to be released is the carrier ca, and the frictional engagement device CL is provided at the power transmission path between the carrier ca and the internal combustion engine E. Therefore, in the electric traveling mode, the carrier ca and the internal combustion engine E becomes a non-contact state (non-connection state), such that the internal combustion engine E is detached from the carrier ca and therefore the carrier ca becomes a freely rotating state. In this embodiment, as indicated by the solid line in FIG. 3, in the electric traveling mode, the rotation speed of the first rotating electrical machine MG1 becomes basically zero, and the carrier ca rotates at a rotation speed that is determined based on the rotation speed of the ring gear r, which is determined in response to the vehicle speed, and the rotation speed of the sun gear s, which is determined in response to the rotation speed of the first rotating electrical machine MG1.

In addition, when the internal combustion engine E is attempted to be started up from a state indicated by the solid line in FIG. 3, the rotation speed control is performed by the rotation speed control unit 71, and therefore the rotation speed of the first rotating electrical machine MG1 is controlled to be equal to the starting up target value Ni (a process indicated by an arrow (1) in FIG. 3). That is, the rotation speed control unit 71 changes the rotation speed of the first rotating electrical machine MG1 with the starting up target value Ni made as a target value. In the example shown in FIG. 3, since the starting up target value Ni is higher than the rotation speed (in this example, zero) of the first rotating electrical machine MG1 at the time of executing the electric traveling mode, the first rotating electrical machine MG1 outputs positive direction torque and increases the rotation speed thereof. Along with this, the rotation speed of the carrier ca to which the internal combustion engine E is connected in a driving manner at the time of engagement of the frictional engagement device CL also increases. In addition, "increase" with respect to the rotation speed means that the rotation speed is made to vary in the positive direction, and "decrease" with respect to the rotation speed means that the rotation speed is made to vary in the negative direction.

A two-dotted line in FIG. 3 represents a state in which the rotation speed of the first rotating electrical machine MG1 reaches the starting up target value Ni by performing the rotation speed control. Although details will be described later, the engagement process of the frictional engagement device CL is performed by the engagement control unit 73 in a state in which the rotation speed of the first rotating electrical machine MG1 reaches the starting up target value Ni. In addition, a starting up instruction is given with respect to the internal combustion engine E on condition that the frictional engagement device CL becomes the direct engagement state. In addition, "reaching" of the rotation speed (for example, the rotation speed of the first rotating electrical machine MG1) that is an object to the target value (target rotation speed) means a state in which a difference between the rotation speed that is an object and the target value becomes less than a threshold value of a determination on whether or not it reaches a target. Here, the threshold value of the determination on whether or not it reaches the target may be set to a value of, for example, 10 rpm to 100 rpm.

In this embodiment, as is clear from FIG. 3, at the time of executing the hybrid traveling mode in which the traveling is made by using the output torque of the internal combustion engine E, basically, the rotation speed of the output member O is set to the positive direction similarly to the rotation speed of the internal combustion engine E.

In addition, in FIG. 4 that is referred to later, a process indicated by an arrow (1) also represents the rotation speed control by the rotation speed control unit 71. In an example illustrated in FIG. 4, since the starting up target value Ni is lower than the rotation speed (in this example, zero) of the first rotating electrical machine MG1 when the electric traveling mode is executed, differently from the case of FIG. 3, the first rotating electrical machine MG1 outputs the negative direction torque to decrease the rotation speed thereof, and along with this, the rotation speed of the carrier ca to which the internal combustion engine E is connected in a driving manner at the time of the engagement of the frictional engagement device CL also decreases.

1-2-6. Configuration of Engagement Control Unit

The engagement control unit 73 is a functional unit that controls an operation of the frictional engagement device CL. The engagement control unit 73 performs an operation control of the frictional engagement device CL by controlling a hydraulic pressure (a supply pressure to the frictional engagement device CL) that is supplied to the frictional engagement device CL through the hydraulic pressure control device 2. Specifically, the engagement control unit 73 generates a hydraulic pressure instruction value with respect to the frictional engagement device CL, and the hydraulic pressure control device 2 supplies a hydraulic pressure corresponding to the hydraulic pressure instruction value to the frictional engagement device CL.

Here, as an engagement state between the two engagement members of the frictional engagement device CL, "released state" in which rotation and torque are not transmitted between the two engagement members, "slip engagement state" in which the two engagement members engage with each other in a state where a difference in the rotation speed therebetween is present, and "direct engagement state" in which the two engagement members engage with each other in a state of integrally rotating, are present. That is, the "slip engagement state" is an engagement state in which torque is transmitted between the two engagement members in a state in which the two engagement members of the frictional engagement device CL rotate relatively to each other. In addition, the "direct engagement state" is an engagement state in which the two engagement members of the frictional engagement device CL are connected directly to each other and therefore the differential rotation is not present between the two engagement members.

A magnitude of torque, which may be transmitted between the two engagement members of the frictional engagement device CL, is determined in response to an engagement pressure of the frictional engagement device CL at that point of time. The magnitude of the torque at this time is set as a transmission torque capacity of the frictional engagement device CL. In this embodiment, an amount of oil supply and a magnitude of a supply pressure to the frictional engagement device CL are controlled in succession by a proportional solenoid valve in response to the hydraulic pressure instruction value with respect to the frictional engagement device CL, and therefore an increase and a decrease of the transmission torque capacity of the frictional engagement device CL may be controlled in succession.

In addition, the engagement control unit 73 performs an operation control of the frictional engagement device CL by a torque control or a rotation speed control. Here, the torque control is a control in which a target transmission torque capacity is set with respect to the frictional engagement device CL, and the hydraulic pressure instruction value is generated so that the transmission torque capacity of the frictional engagement device CL approaches (follows) the target transmission torque capacity. In addition, the rotation speed control is a control in which a target differential rotation speed is set with respect to the frictional engagement device CL, and the hydraulic pressure instruction value is generated so that the difference in the rotation speed between the two engagement members approaches (follows) the target differential rotation speed.

In this embodiment, the engagement control unit 73 includes a synchronization engagement control unit 74 and a non-synchronization engagement control unit 75. In addition, the engagement control unit 73 performs the engagement control of the frictional engagement device CL by the synchronization engagement control unit 74 or the non-synchronization engagement control unit 75 on condition that the rotation speed control is performed by the rotation speed control unit 71, and changes the frictional engagement device CL that is in the released state into the direct engagement state.

The synchronization engagement control unit 74 is a functional unit that performs a synchronization engagement control in which an engagement of the frictional engagement device CL is initiated in the synchronization state to allow the frictional engagement device CL to engage. Here, the synchronization state represents a state in which the difference in the rotation speed between two rotational members that are objects (here, the two engagement members of the frictional engagement device CL) is less than the threshold value of the differential rotation. This synchronization state includes a state in which the rotation speed of one or both rotational members is zero. On the other hand, a state in which the difference in the rotation speed between the two rotational members that are objects is equal to or greater than the threshold value of the differential rotation is a non-synchronization state. This threshold value of the differential rotation is a predetermined threshold value that is set in advance, and for example, may be set to a value of 10 rpm to 100 rpm.

In this embodiment, the synchronization engagement control unit 74 controls the hydraulic pressure instruction value with respect to the frictional engagement device CL so that the transmission torque capacity of the frictional engagement device CL increases with a predetermined change ratio (for example, a constant change ratio) from zero to a value (hereinafter, referred to as "normal direct engagement value") at which a normal direct engagement state is realized so as to change the frictional engagement device CL from the released state to the direct engagement state. In addition, in the synchronization engagement control, since the two engagement members that become objects to engage with each other are in the synchronization state, the change ratio becomes a relatively large value, and the transmission torque capacity of the frictional engagement device CL is increased to the normal direct engagement value within a relatively short time. That is, when the hydraulic pressure, which makes the transmission torque capacity of the frictional engagement device CL have the normal direct engagement value, is set as the "normal hydraulic pressure", the hydraulic pressure instruction value with respect to the frictional engagement device CL is increased to the normal hydraulic pressure within a relatively short time. Here, the "normal direct engagement state" means a state in which the direct engagement state is maintained regardless of a variation in the torque that is transmitted by the frictional engagement device CL. The normal hydraulic pressure to obtain this normal direct engagement state becomes, for example, a line pressure generated by the hydraulic pressure control device 2.

The non-synchronization engagement control unit 75 is a functional unit that performs a non-synchronization engagement control in which an engagement of the frictional engagement device CL is initiated in the non-synchronization state to allow the frictional engagement device CL to engage. Although details will be described later, in FIG. 3 that is previously referred to, a process indicated by an arrow (2) represents the non-synchronization engagement control, and in FIG. 5 that is referred to later, a process indicated by an arrow (1) represents the non-synchronization engagement control. In this embodiment, the non-synchronization engagement control unit 75 decreases the difference in the rotation speed between the two engagement members of the frictional engagement device CL in the slip engagement state, and performs a control to realize the direct engagement state, on condition of being in the synchronization state. At this time, non-synchronization engagement control unit 75 controls the hydraulic pressure instruction value with respect to the frictional engagement device CL so that the transmission torque capacity of the frictional engagement device CL increases with a predetermined change ratio (for example, a constant change ratio) from zero so as to change the frictional engagement device CL from the released state to the slip engagement state. In addition, in this non-synchronization engagement control, the two engagement members that become objects to engage with each other are in the non-synchronization state, the change ratio of the transmission torque capacity becomes a small value compared to the synchronization engagement control. That is, in the non-synchronization engagement control, the transmission torque capacity of the frictional engagement device CL is increased over a long time compared to the synchronization engagement control.

In addition, when it is found that the difference in the rotation speed between two engagement members varies, the non-synchronization engagement control unit 75 controls the hydraulic pressure instruction value with respect to the frictional engagement device CL so that the transmission torque capacity of the frictional engagement device CL is maintained to a value at that point of time. Therefore, the frictional engagement device CL is maintained in the slip engagement state. In addition, the non-synchronization engagement control unit 75 may control the hydraulic pressure instruction value by using the target transmission torque capacity for the slip engagement which is set in advance in such a manner that the transmission torque capacity is maintained to the target transmission torque capacity to maintain the frictional engagement device CL in the slip engagement state.

In addition, when the difference in the rotation speed between the two engagement members decreases due to the transmission of torque in the slip engagement state, and thereby the difference in the rotation speed is less than the threshold value of the differential rotation (that is, when it becomes the synchronization state), the non-synchronization engagement control unit 75 controls the hydraulic pressure instruction value with respect to the frictional engagement device CL so as to change the engagement state of the frictional engagement device CL from the slip engagement state to the direct engagement state. In this embodiment, even after the two engagement members of the frictional engagement device CL become the synchronization state, the non-synchronization engagement control unit 75 maintains the transmission torque capacity in the slip engagement state to allow the frictional engagement device CL to be in the direct engagement state. In addition, after the frictional engagement device CL becomes the direct engagement state, the non-synchronization engagement control unit 75 controls the hydraulic pressure instruction value with respect to the frictional engagement device CL so that the hydraulic pressure increases to the normal hydraulic pressure with a predetermined change ratio (for example, a constant change ratio). Therefore, the transmission torque capacity of the frictional engagement device CL increases to the normal direct engagement value with a predetermined change ratio (for example, a constant change ratio), and therefore the frictional engagement device becomes the normal direct engagement state.

In addition, the rotating electrical machine control unit 78 performs the rotation speed control (in this example, a rotation speed feedback control) so that the rotation speed of the first rotating electrical machine MG1 is maintained to a rotation speed (that is, the starting up target value Ni) that is reached by the rotation speed control of the rotation speed control unit 71 until the frictional engagement device CL becomes the direct engagement state by the performing of the non-synchronization engagement control. In this embodiment, the input member I (the internal combustion engine E) is connected in a driving manner to the first engagement member CLa of the frictional engagement device CL, and the second rotational element e2 (the carrier ca) is connected in a driving manner to the second engagement member CLb. In addition, since the rotation speed of the carrier ca is uniquely determined in response to a vehicle speed and the rotation speed of the first rotating electrical machine MG1, when the vehicle speed is constant during performing the non-synchronization engagement control, the rotation speed of the carrier ca is also maintained to a constant value.

Figure 5:
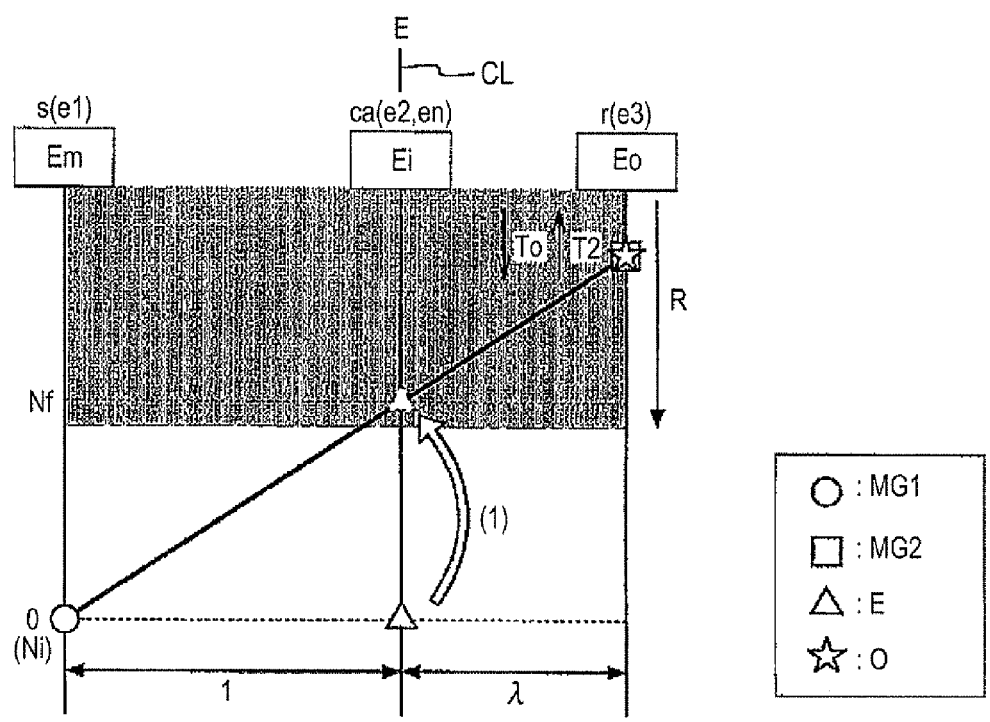
FIG. 5 is a speed diagram illustrating an operation of a third starting up preparation control according to the first embodiment of the invention.

Therefore, the rotation speed of the internal combustion engine E increases toward the rotation speed of the carrier ca by the performing of the non-synchronization engagement control (a process indicated by the arrow (2) in FIG. 3 and a process indicated by an arrow (1) in FIG. 5), and the rotation speed of the internal combustion engine E becomes equal to the rotation speed of the carrier ca in the direct engagement state. During this non-synchronization engagement control, the first rotating electrical machine MG1 outputs the positive direction torque, and maintains the rotation speed thereof to the starting up target value Ni. In addition, the rotating electrical machine control unit 78 performs a control to correct the output torque of the second rotating electrical machine MG2 so as to remove output torque of the first rotating electrical machine MG1, which is transmitted to the wheels W through the ring gear r when initiating the engagement of the frictional engagement device CL, or load torque caused by the internal combustion engine E.

1-2-7. Configuration of Starting Up Instruction Unit

The starting up instruction unit 77 is a functional unit that gives a starting up instruction with respect to the internal combustion engine E on condition that the frictional engagement device CL becomes the direct engagement state, and the rotation speed of the internal combustion engine E becomes a starting up rotation speed Nf (described later). As described above, the vehicle is provided with the internal combustion engine control unit 3 that performs the operation control of the internal combustion engine E, and the starting up instruction unit 77 gives an instruction of staring up the internal combustion engine E with respect to the internal combustion engine control unit 3 to start up the internal combustion engine E. Hereinafter, a control, which is performed after the internal combustion engine starting up condition is established, to allow the frictional engagement device CL to be the direct engagement state and to allow the rotation speed of the internal combustion engine E to be the starting up rotation speed Nf is referred to as "starting up preparation control". In addition, this starting up preparation control is performed mainly by the rotation speed control unit 71 and the engagement control unit 73.

However, to start up the internal combustion engine E, it is necessary for the rotation speed of the internal combustion engine E to be a rotation speed at which ignition is possible. That is, when a rotation speed range in which the internal combustion engine may be started up is set to the startable rotation speed range R, it is necessary that the rotation speed at the time of starting up the internal combustion engine E is a value within the startable rotation speed range R. The startable rotation speed range R is a range having the lower limit as shown in FIG. 3, and the starting up rotation speed Nf that is a target value of the rotation speed of the internal combustion engine E, which is to start up the internal combustion engine E, is set within the startable rotation speed range R. In addition, the lower limit of the startable rotation speed range R is set by, for example, the number of idle rotations of the internal combustion engine E.

The starting up rotation speed Nf may be set to an arbitrary value within the startable rotation speed range R. For example, the starting up rotation speed Nf may be set to the lower limit of the startable rotation speed range R, or a value higher than the lower limit by a predetermined rotation speed. For example, this predetermined rotation speed may be a rotation speed that is determined in a range of 50 to 500 rpm. In addition, the starting up rotation speed Nf may be set to a rotation speed which is a rotation speed within the startable rotation speed range R and at which the internal combustion engine E may output the internal combustion engine request torque, based on the internal combustion engine request torque determined by the request torque determining unit 76. At this time, for example, in the rotation speeds which are included in the startable rotation speed range R and at which the internal combustion engine request torque may be output, a rotation speed in which a fuel consumption rate is lowest (a fuel efficiency is good) may be set as the starting up rotation speed Nf.

Figure 4:
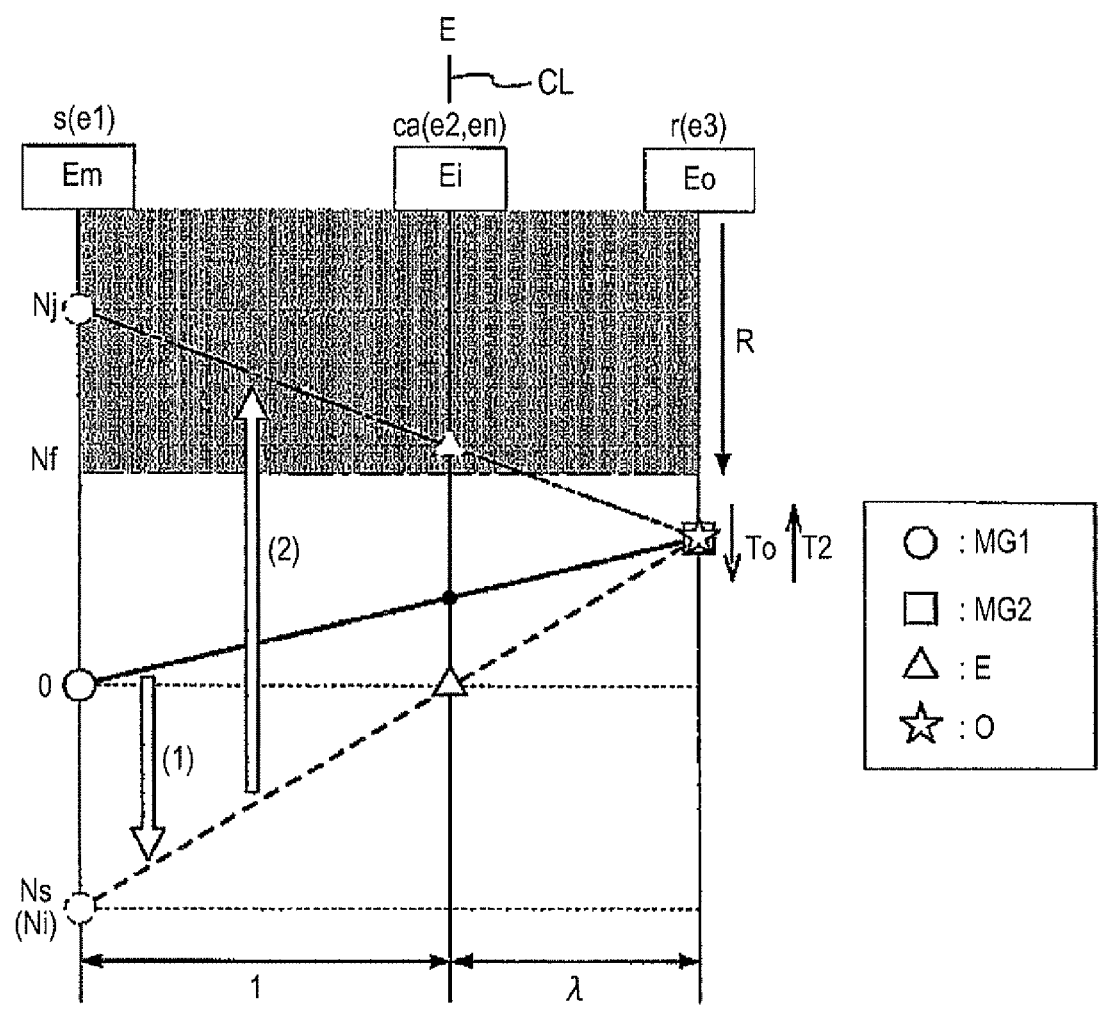
FIG. 4 is a speed diagram illustrating an operation of a second starting up preparation control according to the first embodiment of the invention.

However, as described later in detail, there are a case where the rotation speed of the internal combustion engine E reaches the starting up rotation speed Nf in a state in which the frictional engagement device CL becomes the direct engagement state by the control of the engagement control unit 73 (refer to FIGS. 3 and 5), and a case where the rotation speed of the internal combustion engine E does not reach the starting up rotation speed Nf in a state in which the frictional engagement device CL becomes the direct engagement state by the control of the engagement control unit 73, and the rotation speed of the internal combustion engine E reaches the starting up rotation speed Nf by controlling the rotation speed of the first rotating electrical machine MG1 after the frictional engagement device CL becomes the direct engagement state (FIG. 4). Which case of these will occur is different depending on a method of setting the starting up target value Ni (described later).

1-2-8. Configuration of Starting Up Target Value Setting Unit

The starting up target value setting unit 72 is a functional unit that sets the starting up target value Ni. As described above, the starting up target value Ni is the target value of the rotation speed of the first rotating electrical machine MG1 when the rotation speed control by the rotation speed control unit 71 is performed. The starting up target value setting unit 72 sets the starting up target value Ni when the starting up condition of the internal combustion engine is established at the released and stopped state.

Specifically, first, the starting up target value setting unit 72 determines whether or not the rotation speed when the starting up condition is established is included within a specific rotation speed range, based on the rotation speed of the first rotating electrical machine MG1 when the internal combustion engine starting up condition is established (hereinafter, referred to as "rotation speed when a starting up condition is established"). Here, the specific rotation speed range is a rotation speed range of the first rotating electrical machine MG1 to allow the rotation speed (hereinafter, referred to as "rotation speed at the time of a direct connection") of the internal combustion engine E when the frictional engagement device CL becomes the direct engagement state by the control of the engagement control unit 73 to be a rotation speed within the startable rotation speed range R. Specifically, when it is assumed that the rotational element to which the first rotating electrical machine MG1 is connected in a driving manner rotates at a rotation speed of the first rotating electrical machine MG1 when the starting up condition is established, and the rotational element to which the output member O is connected in a driving manner rotates at a rotation speed of the output member O when the internal combustion engine starting up condition is established, in a case where the rotation speed of the rotational element to which the internal combustion engine E is connected in a driving manner is equal to or greater than the lower limit of the startable rotation speed range R, the rotation speed when the starting up condition is established is included in the specific rotation speed range.

In this embodiment, the internal combustion engine E is connected in a driving manner to the carrier ca through the frictional engagement device CL, and in the direct engagement state, the rotation speed of the internal combustion engine E becomes equal to the rotation speed of the carrier ca. Therefore, in this embodiment, when the rotation speed of the carrier ca when the internal combustion engine starting up condition is established is equal to or greater than the lower limit of the startable rotation speed range R, the rotation speed of the first rotating electrical machine MG1 when the starting up condition is established is included in the specific rotation speed range. In FIGS. 3 to 5, since a state indicated by a solid line represents a state in which the internal combustion engine starting up condition is established, in an example illustrated in FIGS. 3 and 4, the rotation speed of the carrier ca when the starting up condition is established is less than the lower limit of the startable rotation speed range R, and therefore the rotation speed when the starting up condition is established is not included in the specific rotation speed range. In addition, in an example illustrated in FIG. 5, the rotation speed of the carrier ca when the starting up condition is established is equal to or greater than the lower limit of the startable rotation speed range R, such that the rotation speed when the starting up condition is established is included in the specific rotation speed range.

In addition, the rotation speed (Nca) of the carrier ca is uniquely determined based on a rotation speed (Nsu) of the sun gear s, a rotation speed (Nri) of the ring gear r, and a gear ratio $\lambda$ as expressed by following equation (1)

$$Nca=(Nri+\lambda \cdot Nsu)/(1+\lambda) \qquad (1)$$

Therefore, when determining whether or not the rotation speed when the staring up condition is established is included within the specific rotation speed range, the starting up target value setting unit 72 acquires both the rotation speed of the sun gear s and the rotation speed of the ring gear r when the staring up condition is established and performs the determination. In addition, the rotation speed of the sun gear s when the internal combustion engine starting up condition is established is acquired based on the detection information of the first rotor shaft sensor Se2 (in this example, basically zero), the rotation speed of the ring gear r when the internal combustion engine starting up condition is established is acquired based on the detection information of the output member sensor Se3. In addition, since the rotation speed of the ring gear r is proportional to the rotation speed of the second rotating electrical machine MG2, the rotation speed of the ring gear r may be acquired based on a detection result of a rotation sensor (resolver or the like) provided to the second rotating electrical machine MG2.

As is the case with FIGS. 3 and 4, in a case where the rotation speed when the starting up condition is established is not included within the specific rotation speed range, the starting up target value setting unit 72 further determines whether or not the internal combustion engine request torque is equal to or greater than the request determination threshold value that is determined in advance. The request determination threshold value is a threshold value to determine magnitude of the internal combustion engine request torque and may be set to an arbitrary value. In addition, the request determination threshold value may be a fixed value or a variable value. For example, in a case where a driver may select a driving mode (for example, an echo mode, a sports mode, or the like) of a vehicle, the request determination threshold value may be set in a variable manner to a value different in each case in response to the driving mode. In this configuration, in a case where the driver selects a driving mode like the sports mode in which a high responsiveness of a driving force (torque) is required, the request determination threshold value may be set to be small.

In addition, in a case where the internal combustion engine request torque is equal to or higher than the request determination threshold value, as shown in FIG. 3, the starting up target value setting unit 72 sets the starting up target value Ni in such a manner that the rotation speed of the internal combustion engine E at the time of direct engagement becomes the starting up rotation speed Nf. The starting up target value Ni at this case is uniquely determined based on the rotation speed (Nri) of the ring gear r, the starting up rotation speed Nf, and the gear ratio $\lambda$ as expressed by the follow equation (2). Hereinafter, a method of setting this starting up target value Ni is referred to as "first setting method", and a starting up preparation control including an execution of the first setting method is referred to as "first starting up preparation control".

$$Ni=\{(1+\lambda)\cdot Nf-Nri\}/\lambda \qquad (2)$$

In addition, in a case where the internal combustion engine request torque is less than the request determination threshold value, the starting up target value setting unit 72 sets the synchronization rotation speed Ns, which is the rotation speed of the first rotating electrical machine MG1 that allows the two engagement members of the frictional engagement device CL to be the synchronization state, as the starting up target value Ni, regardless of the starting up rotation speed Nf.

In addition, in this embodiment, the synchronization rotation speed Ns is uniquely determined based on the rotation speed (Nri) of the ring gear r and the gear ratio λ as expressed by following equation (3). Hereinafter, a method of setting this starting up target value Ni is referred to as "second setting method", and a starting up preparation control including an execution of the second setting method is referred to as "second starting up preparation control".

$$Ns = -Nri/\lambda \tag{3}$$

In this embodiment, when setting the starting up target value Ni based on the first setting method or the second setting method, the starting up target value setting unit 72 performs an arithmetic operation based on the equation (2) or equation (3) to derive the starting up target value Ni. In this embodiment, since the rotation speed of the ring gear r is uniquely determined based on the rotation speed of the output member O, the setting of the starting up target value Ni based on the first setting method (equation (2)) is based on the rotation speed of the output member O, the starting up rotation speed Nf, and the gear ratio λ of the differential gear unit DG. In addition, data of the starting up target value Ni, which is derived based on the equation (2) or equation (3), may be stored in advance in the memory device, and when the internal combustion engine starting up condition is established, the starting up target value setting unit 72 may acquire data of the starting up target value Ni, which corresponds to the rotation speed of the ring gear r when the internal combustion engine starting up condition is established, with reference to the memory device.

On the other hand, as is the case with FIG. 5, in a case where the rotation speed when the starting up condition is established is included within the specific rotation speed range, the starting up target value setting unit 72 sets the rotation speed when the starting up condition is established as the starting up target value Ni. In an example illustrated in FIG. 5, since the rotation speed when the starting up condition is established is zero, the starting up target value Ni is set to zero. In this case, since the rotation speed when the starting up condition is established, which is a current rotation speed of the first rotating electrical machine MG1, is equal to the starting up target value Ni, in the rotation speed control by the rotation speed control unit 71, which is performed after the setting of the starting up target value Ni, a control to maintain the rotation speed of the first rotating electrical machine MG1 is performed. Hereinafter, a method of setting this starting up target value Ni is referred to as "third setting method", and a starting up preparation control including the third setting method is referred to as "third staring up preparation control".

A situation in which the rotation speed when the starting up condition is established is included in the specific rotation speed range may occur in a case in which the vehicle speed is relatively high, as shown in FIG. 5. In addition, in a configuration in which an auxiliary machine is driven by using the rotation of the carrier ca, although not shown, even when the first rotating electrical machine MG1 rotates with a predetermined rotation speed so as to drive the auxiliary machine, a situation in which the rotation speed when the starting up condition is established is included in the specific rotation speed range may occur.

In addition, FIG. 5 illustrates a case where the rotation speed of the carrier ca when the internal combustion engine starting up condition is established is equal to the starting up rotation speed Nf, and thereby the rotation speed of the internal combustion engine E at the time of direct connection is equal to the starting up rotation speed Nf, as an example. The setting of the starting up target value Ni based on the third setting method is not limited to this case. That is, in this embodiment, it is configured that even when the rotation speed of the carrier ca when the internal combustion engine starting up condition is established is not equal to the starting up rotation speed Nf, in a case where the rotation speed when the starting up condition is established is included in the specific rotation speed range, the rotation speed when the starting up condition is established is set as the starting up target value Ni, and a starting up instruction is given with respect to the internal combustion engine E in a state in which the rotation speed of the internal combustion engine E reaches a rotation speed at the time of direct connection, which is different from the starting up rotation speed Nf.

1-3. Details of First Starting Up Preparation Control

Details of the first starting up preparation control will be described with reference to FIG. 6. In addition, the first starting up preparation control is a control in which when the internal combustion engine starting up condition is established, the starting up target value Ni is set based on the first setting method, and then the rotation speed control by the rotation speed control unit 71 and the non-synchronization engagement control by the non-synchronization engagement control unit 75 are sequentially performed. That is, the first starting up preparation control is a starting up preparation control that is performed in a case where the rotation speed when the starting up condition is established is not included in the specific rotation speed range and in a case where the internal combustion engine request torque is equal to or greater than the request determination threshold value that is determined in advance. In addition, by the performing of the first starting up preparation control, a starting up instruction is given with respect to the internal combustion engine E by the starting up instruction unit 77 in a state in which the frictional engagement device CL becomes the direct engagement state and the rotation speed of the internal combustion engine E becomes the starting up rotation speed Nf.

Figure 6:
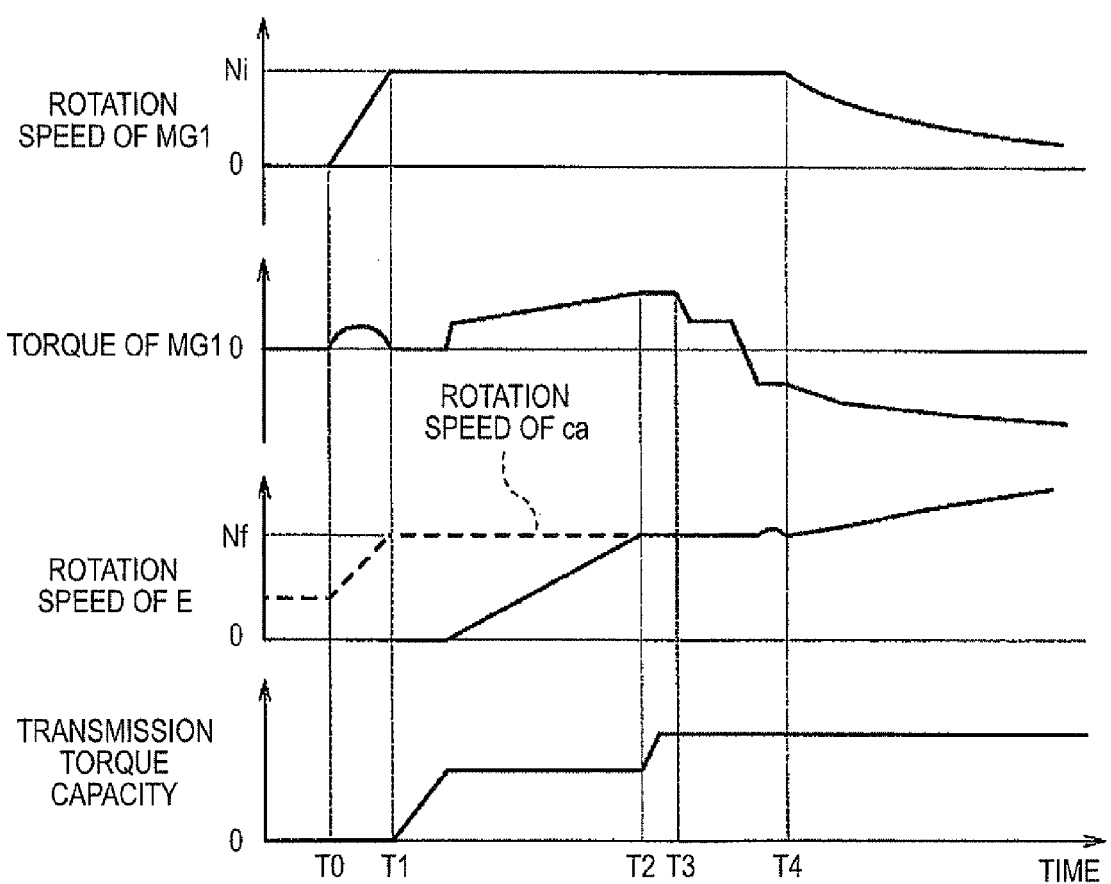
FIG. 6 is a time chart illustrating an example of an operation state of respective units at the time of performing the first starting up preparation control according to the first embodiment of the invention.

FIG. 6 shows a diagram illustrating an example of a time chart when the first starting up preparation control is performed and the internal combustion engine E is started up during traveling in the electric traveling mode. In addition, in FIG. 6, it is assumed that a request for the starting up of the internal combustion engine E is made at time T0 (a transition to the hybrid traveling mode is determined by the traveling mode determining unit 79), and the internal combustion engine E initiates a self-sustained operation at time T4.

The transmission torque capacity of the frictional engagement device CL becomes zero until it reaches time T0, and a vehicle travels by the output torque of the second rotating electrical machine MG2 in a state in which the internal combustion engine E is stopped. The rotation speed of the first rotating electrical machine MG1 becomes zero and the first rotating electrical machine MG1 becomes a state in which torque is not output. Therefore, the carrier ca becomes a state in which it rotates at a predetermined rotation speed (refer to the solid line in FIG. 3).

When a request for the starting up of the internal combustion engine E is made at time T0, the rotation speed control unit 71 performs the rotation speed control to change the rotation speed of the first rotating electrical machine MG1. At this time, the rotation speed of the first rotating electrical machine MG1 is controlled to vary with the starting up target value Ni, which is set by the starting up target value setting unit 72 based on the first setting method, made as a target value. Specifically, the first rotating electrical machine MG1 is controlled by the rotation speed feedback control to output positive direction torque and thereby the rotation speed thereof increases, and along with this, the rotation speed of the carrier ca increases (a process indicated by the arrow (1) in FIG. 3). Then, at time T1, the rotation speed of the first rotating electrical machine MG1 reaches the starting up target value Ni that is a target value (refer to the two-dotted line in FIG. 3).

At time T1, when the rotation speed of the first rotating electrical machine MG1 reaches the starting up target value Ni, the non-synchronization engagement control unit 75 initiates the engagement of the frictional engagement device CL, and changes the frictional engagement device CL from the released state to the direct engagement state (a process indicated by the arrow (2) in FIG. 3). In this example, at time T1, the non-synchronization engagement control unit 75 controls the hydraulic pressure instruction value with respect to the frictional engagement device CL in such a manner that the transmission torque capacity of the frictional engagement device CL increases from zero with a constant change ratio. In addition, when a variation in the rotation speed of the internal combustion engine E, which is detected by the input member sensor Se1, is found, the hydraulic pressure instruction value with respect to the frictional engagement device CL is controlled in such a manner that the transmission torque capacity of the frictional engagement device CL is maintained at a value at that point of time. Therefore, the frictional engagement device CL is maintained in the slip engagement state.

In addition, the rotation speed of the first rotating electrical machine MG1 is maintained to the starting up target value Ni by the rotation speed feedback control until the frictional engagement device CL becomes the direct engagement state after time T1. Therefore, after the frictional engagement device CL becomes the slip engagement state, the first rotating electrical machine MG1 is controlled to output positive direction torque and thereby the rotation speed of the internal combustion engine E increases toward the starting up rotation speed Nf. In addition, a difference in the rotation speed between the carrier ca and the internal combustion engine E decreases with the passage of time after becoming the slip engagement state, and at time T2, the rotation speed of the internal combustion engine E reaches the starting up rotation speed Nf, and the rotation speeds of the carrier ca and the internal combustion engine E are equal to each other, and thereby the frictional engagement device CL becomes the direct engagement state. In this manner, in the first starting up preparation control, when the frictional engagement device CL becomes the direct engagement state, automatically, the rotation speed of the internal combustion engine E reaches the starting up rotation speed Nf.

In addition, after the frictional engagement device CL becomes the direct engagement state (in this example, a direct engagement state in which an engagement pressure is lower than that of a normal direct engagement state) (time T2), a control to allow the frictional engagement device CL to be changed to the normal direct engagement state is performed by the non-synchronization engagement control unit 75. Specifically, the non-synchronization engagement control unit 75 controls the hydraulic pressure instruction value with respect to the hydraulic pressure control device 2 so that the transmission torque capacity of the frictional engagement device CL increases to the normal direct engagement value (transmission torque capacity corresponding to a normal hydraulic pressure) with a constant change ratio.

At time T3 after the transmission torque capacity of the frictional engagement device CL becomes the normal direct engagement value, the starting up instruction unit 77 give an instruction of starting up the internal combustion engine E with respect to the internal combustion engine control unit 3 and thereby the internal combustion engine E is started up by the internal combustion engine control unit 3. After the internal combustion engine E is started up, the output torque of the first rotating electrical machine MG1 is changed in a negative direction in response to a magnitude of the positive direction torque output by the internal combustion engine E. At time T4, after the internal combustion engine E initiates a self-sustained operation, the first rotating electrical machine MG1 is controlled to output a reaction force (negative direction torque) with respect to the torque of the internal combustion engine E.

1-4. Details of Second Starting Up Preparation Control

Details of a second starting up preparation control will be described with reference to FIG. 7. In addition, the second starting up preparation control is a control in which when the internal combustion engine starting up condition is established, the starting up target value Ni is set based on the second setting method, and then the rotation speed control by the rotation speed control unit 71 and the synchronization engagement control by the synchronization engagement control unit 74 are sequentially performed, and a control to change the rotation speed of the first rotating electrical machine MG1 is further performed after the synchronization engagement with a starting up target value Nj (described later) made as a target value. That is, the second starting up preparation control is a starting up preparation control that is performed in a case where the rotation speed when the starting up condition is established is not included within the specific rotation speed range, and the internal combustion engine request torque is less than the request determination threshold value that is determined in advance. In addition, a starting up instruction is given with respect to the internal combustion engine E by the starting up instruction unit 77 in a state in which the frictional engagement device CL becomes the direct engagement state and the rotation speed of the internal combustion engine E becomes the starting up rotation speed Nf by the performing of the second starting up preparation control.

Figure 7:
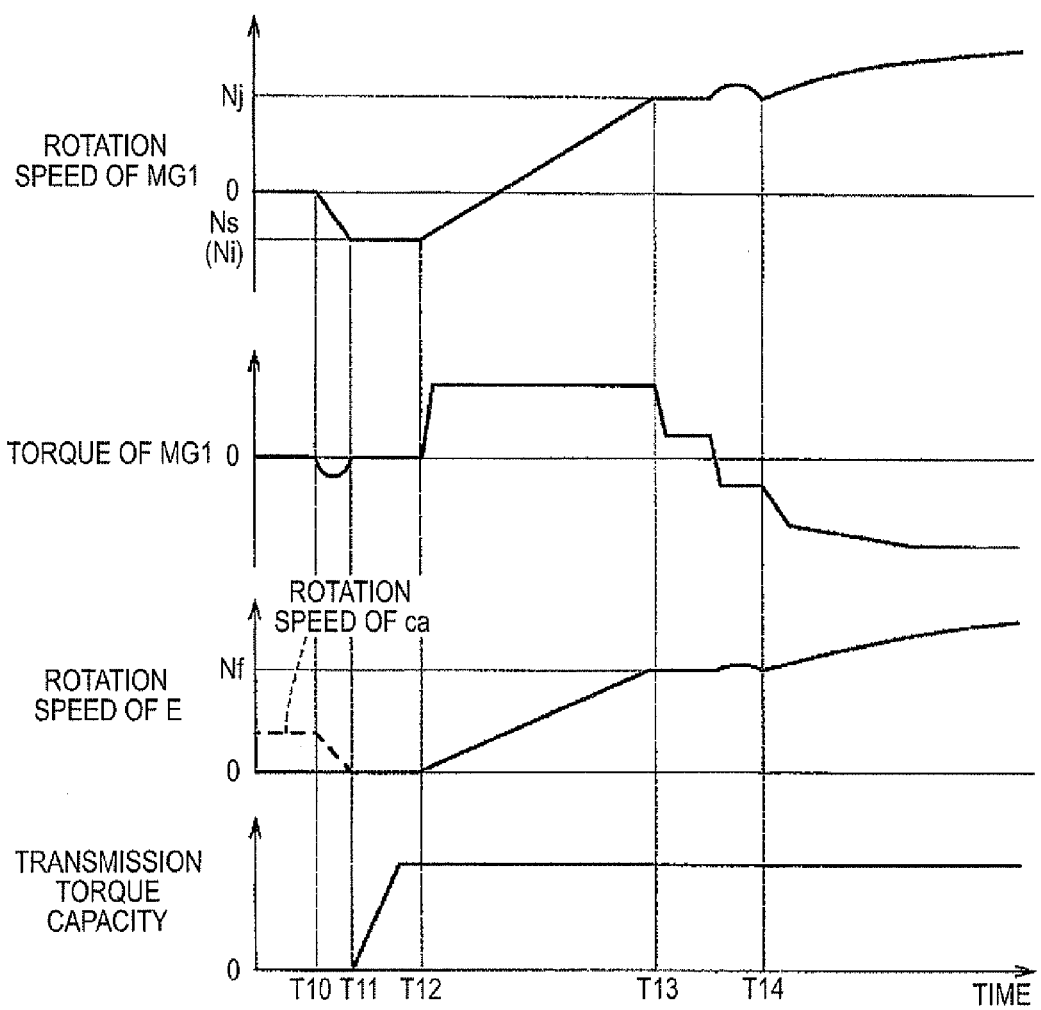
FIG. 7 is a time chart illustrating an example of an operation state of respective units at the time of performing the second starting up preparation control according to the first embodiment of the invention.

FIG. 7 shows a diagram illustrating an example of a time chart at the time of starting up the internal combustion engine E by performing the second starting up preparation control during traveling in the electric traveling mode. In addition, in FIG. 7, it is assumed that a request for the starting up of the internal combustion engine E is made at time T10 (a transition to a hybrid traveling mode is determined by the traveling mode determining unit 79), and the internal combustion engine E initiates a self-sustained operation at time T14.

The transmission torque capacity of the frictional engagement device CL becomes zero until it reaches time T10, and a vehicle travels by the output torque of the second rotating electrical machine MG2 in a state in which the internal combustion engine E is stopped. The rotation speed of the first rotating electrical machine MG1 becomes zero and the first rotating electrical machine MG1 becomes a state in which torque is not output. Therefore, the carrier ca becomes a state in which it rotates at a predetermined rotation speed (refer to the solid line in FIG. 4).

When a request for the starting up of the internal combustion engine E is made at time T10, the rotation speed control unit 71 performs the rotation speed control to change the rotation speed of the first rotating electrical machine MG1. At this time, the rotation speed of the first rotating electrical machine MG1 is controlled to vary with the starting up target value Ni (that is, the synchronization rotation speed Ns), which is set by the starting up target value setting unit 72 based on the second setting method, made as a target value. Specifically, the first rotating electrical machine MG1 is controlled by the rotation speed feedback control to output negative direction torque, and thereby the rotation speed thereof decreases (a process indicated by the arrow (1) in FIG. 4). Then, at time T11, the rotation speed of the first rotating electrical machine MG1 reaches the starting up target value Ni (the synchronization rotation speed Ns) that is a target value (refer to a broken line in FIG. 4).

At time T11, when the rotation speed of the first rotating electrical machine MG1 reaches the starting up target value Ni (the synchronization rotation speed Ns), and the two engagement members of the frictional engagement device CL become the synchronization state, the synchronization engagement control unit 74 initiates the engagement of the frictional engagement device CL to change the frictional engagement device CL from the released state to the direct engagement state. That is, in the second starting up preparation control, the synchronization engagement control is performed instead of the non-synchronization engagement control. In this example, the synchronization engagement control unit 74 controls the hydraulic pressure instruction value with respect to the hydraulic pressure control device 2 so that the transmission torque capacity of the frictional engagement device CL increases with a constant change ratio from zero to the normal direct engagement value (transmission torque capacity corresponding to the normal hydraulic pressure). At this time, the rotation speed of the first rotating electrical machine MG1 is maintained to the starting up target value Ni (synchronization rotation speed Ns).

In addition, after the frictional engagement device becomes a direct engagement state (in this example, the normal direct engagement state) (time T12), the control device 70 changes the rotation speed of the first rotating electrical machine MG1 through the rotating electrical machine control unit 78 with the starting up target value Nj after the synchronization engagement made as a target value (a process indicated by an arrow (2) in FIG. 4). In addition, as shown in FIG. 4, the starting up target value Nj after the synchronization engagement is a rotation speed of the first rotating electrical machine MG1, which allows the rotation speed of the internal combustion engine E to be a value within the startable rotation speed range R (in this example, the starting up rotation speed Nf). This starting up target value Nj after the synchronization engagement is uniquely determined based on the rotation speed of the ring gear r, the starting up rotation speed Nf, and the gear ratio λ similarly to the starting up target value Ni in the first starting up preparation control.

When the rotation speed of the first rotating electrical machine MG1 is changed with the starting up target value Nj after the synchronization engagement made as a target value, since the frictional engagement device CL is in the direct engagement state, the rotation speed of the internal combustion engine E also increases along with an increase in the rotation speed of the first rotating electrical machine MG1. In this example, the rotation speed of the first rotating electrical machine MG1 is controlled by a rotation speed feedback control so that the rotation speed of the internal combustion engine E increases with a constant change ratio. At this time, the rotating electrical machine control unit 78 performs a control to correct the output torque of the second rotating electrical machine MG2 so as to remove output torque of the first rotating electrical machine MG1, which is transmitted to the wheels W through the ring gear r, or load torque caused by the internal combustion engine E.

At time T13, when the rotation speed of the first rotating electrical machine MG1 reaches the starting up target value Nj after the synchronization engagement, the rotation speed of the internal combustion engine E reaches the starting up rotation speed Nf (refer to two-dotted line in FIG. 4). In this state, the starting up instruction unit 77 gives an instruction of starting up the internal combustion engine E with respect to the internal combustion engine control unit 3, and therefore the internal combustion engine E is started up by the internal combustion engine control unit 3. After the internal combustion engine E is started up, the output torque of the first rotating electrical machine MG1 is changed in a negative direction in response to the magnitude of positive direction torque output from the internal combustion engine E, and at time T14, after the internal combustion engine E initiates the self-sustained operation, the first rotating electrical machine MG1 is controlled to output a reaction force (negative direction torque) with respect to the torque of the internal combustion engine E.

1-5. Details of Third Starting Up Preparation Control

Details of a third starting up preparation control will be described. In addition, the third starting up preparation control is a control in which when the internal combustion engine starting up condition is established, the starting up target value Ni is set based on the third setting method, and then the rotation speed control by the rotation speed control unit 71 and the non-synchronization engagement control by the non-synchronization engagement control unit 75 are sequentially performed. That is, the third starting up preparation control is a starting up preparation control that is performed in a case where the rotation speed when the starting up condition is established is included within the specific rotation speed range. In addition, a starting up instruction is given with respect to the internal combustion engine E by the starting up instruction unit 77 in a state in which the frictional engagement device CL becomes the direct engagement state and the rotation speed of the internal combustion engine E becomes the starting up rotation speed Nf by the performing of the third starting up preparation control.

The details of the third starting up preparation control is basically the same as the first starting up preparation control except for the method of setting the starting up target value Ni, such that a brief description thereof will be made below. In the third starting up preparation control, since the starting up target value Ni is set based on the third setting method, until the engagement control is initiated by the non-synchronization engagement control unit 75 after the internal combustion engine starting up condition is established, the rotation speed of the first rotating electrical machine MG1 (zero in an example illustrated in FIG. 5), the output torque of the first rotating electrical machine MG1 (zero in the example illustrated in FIG. 5), and the rotation speed of the carrier ca (the same as the starting up rotation speed Nf in the example illustrated in FIG. 5) become basically constant. In addition, operations of respective units after initiating the engagement control by the non-synchronization engagement control unit 75 are basically the same as the operations after time T1 in the first starting up preparation control described above with reference to FIG. 6. However, the rotation speed of the first rotating electrical machine MG1 is maintained near zero.

1-6. Procedure of Internal Combustion Engine Starting Up Control

Figure 8:
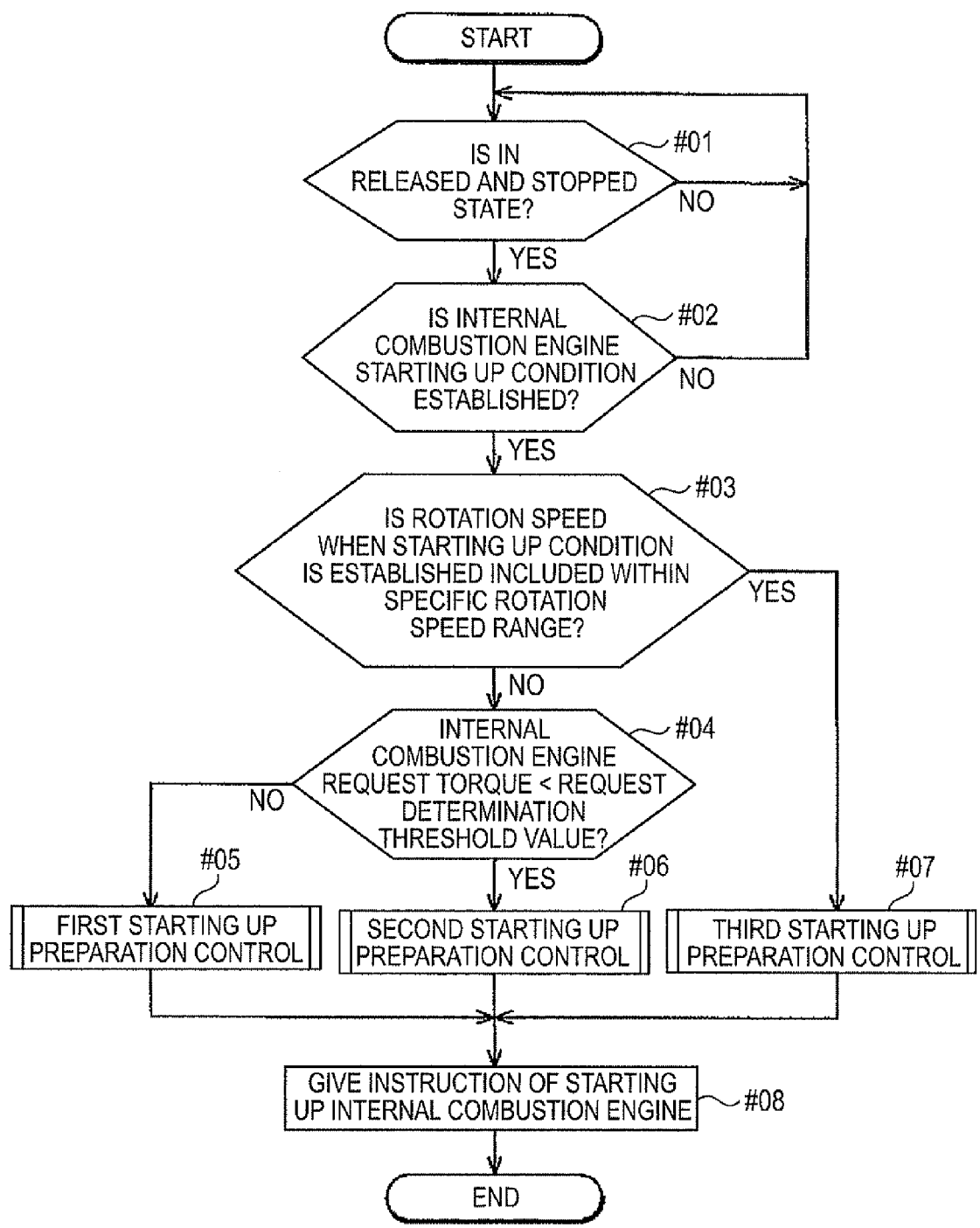
FIG. 8 is a flowchart illustrating an overall procedure of the internal combustion engine starting up control according to the first embodiment of the invention.
Figure 9:
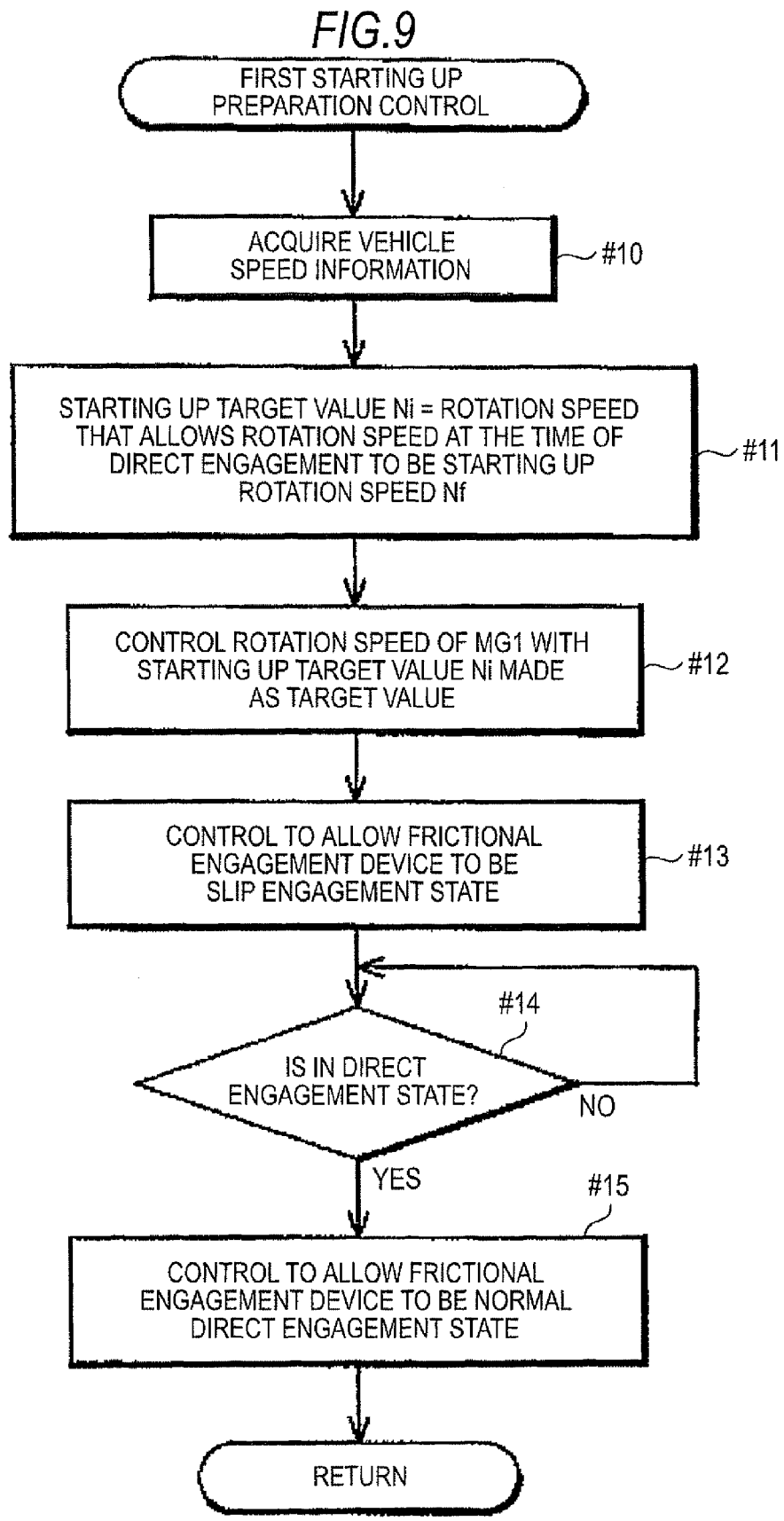
FIG. 9 is a flowchart illustrating a procedure of the first starting up preparation control according to the first embodiment of the invention.
Figure 10:
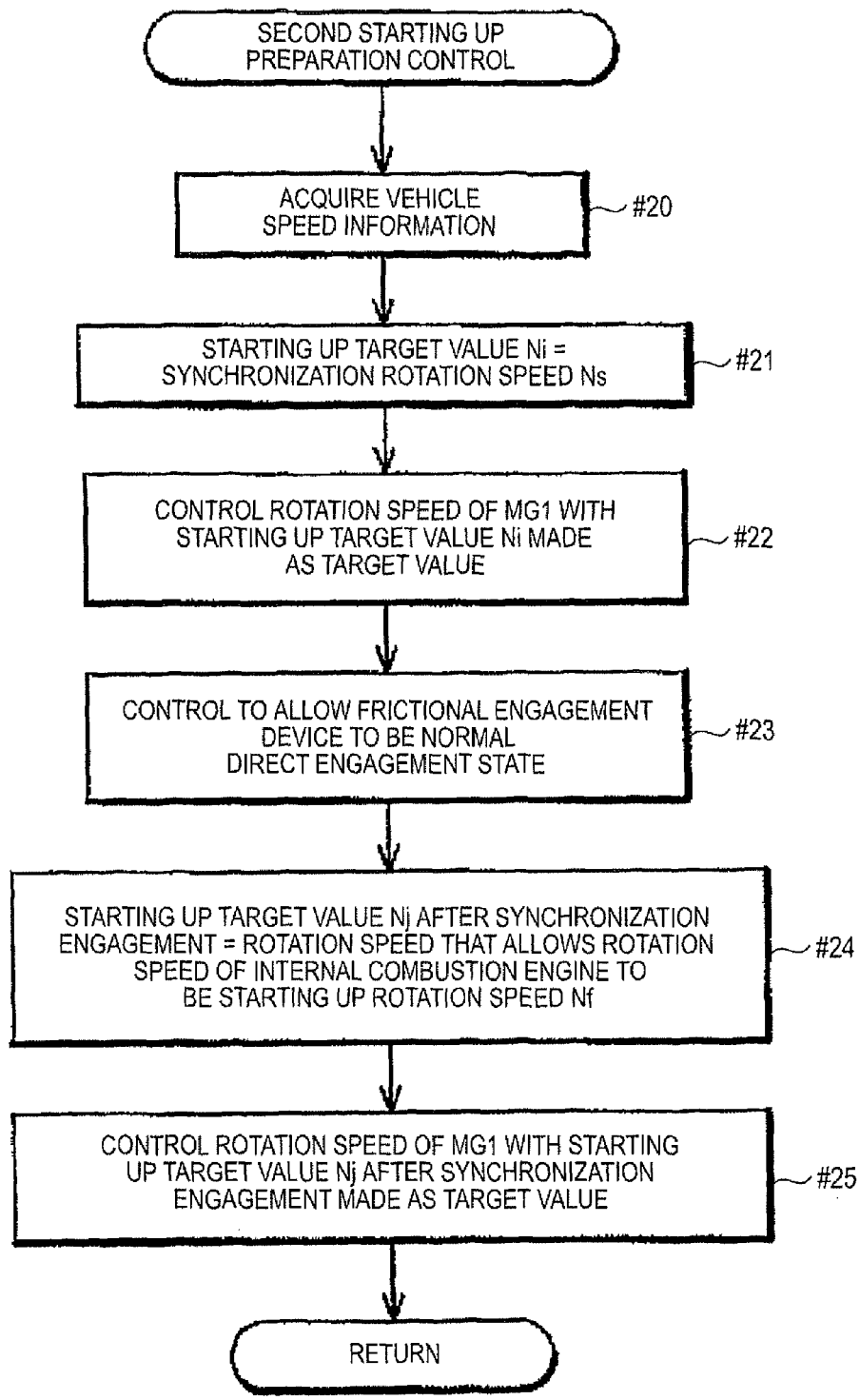
FIG. 10 is a flowchart illustrating a procedure of the second starting up preparation control according to the first embodiment of the invention.
Figure 11:
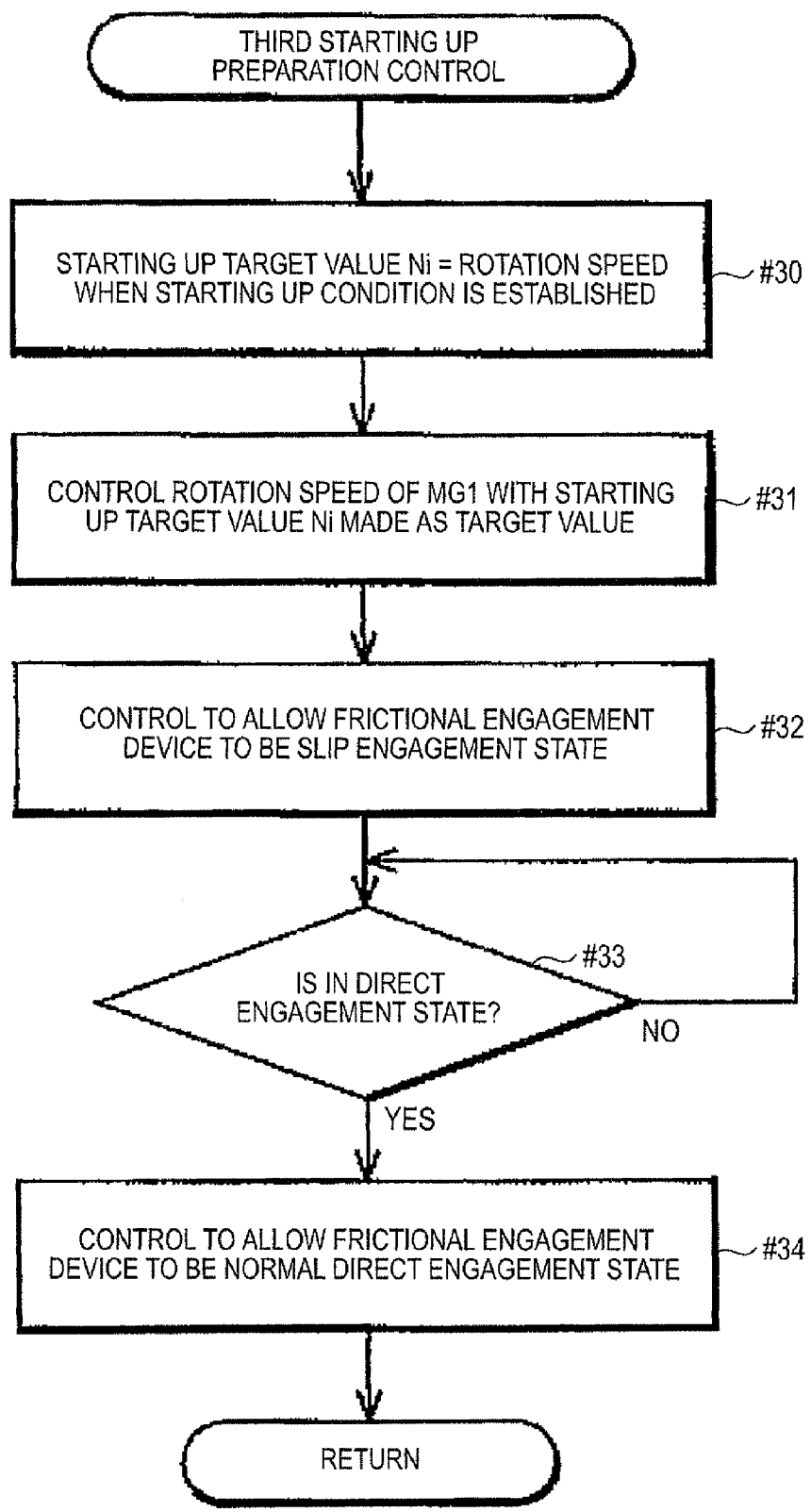
FIG. 11 is a flowchart illustrating a procedure of the third starting up preparation control according to the first embodiment of the invention.

Next, a procedure of the staring up control of the internal combustion engine according to this embodiment will be described with reference to flow charts in FIGS. 8 to 11. In addition, FIG. 8 shows a flow chart illustrating an overall procedure of an internal combustion engine starting up control. FIG. 9 shows a flow chart illustrating a procedure of the first starting up preparation control in step #05 in FIG. 8. FIG. 10 shows a flow chart illustrating a procedure of the second starting up preparation control in step #06 in FIG. 8. FIG. 11 shows a flow chart illustrating a procedure of the third starting up preparation control in step #07 in FIG. 8. Respective procedures described below are performed by respective functional units of the control device 70. In a case where each of the respective functional units is configured by a program, an arithmetic operation processing unit provided to the control device 70 operates as a computer executing the program making up each of the functional units.

1-6-1. Overall Procedure of Starting Up Control of Internal Combustion Engine

As shown in FIG. 8, when the internal combustion engine starting up condition is established (step #02: Yes) in a released and stopped state in which the frictional engagement device CL is in the released state and the internal combustion engine E is stopped (step #01: Yes), the starting up target value setting unit 72 acquires vehicle speed information, and determines whether or not the rotation speed when the starting up condition is established, which is a rotation speed of the first rotating electrical machine MG1 when the internal combustion engine starting up condition is established, is included within the specific rotation speed range (step #03).

In addition, in a case where the rotation speed when the starting up condition is established is not included within the specific rotation speed range (step #03: No), determination on whether or not the internal combustion engine request torque is less than the request determination threshold value that is determined in advance is performed (step #04). In addition, in a case where the internal combustion engine request torque is not less than the request determination threshold value, that is, in a case where the internal combustion engine request torque is equal to or greater than the request determination threshold value (step #04: No), the starting up instruction unit 77 gives a starting up instruction with respect to the internal combustion engine E (step #08) after the first starting up preparation control is performed (step #05). On the other hand, in a case where the internal combustion engine request torque is less than the request determination threshold value (step #04: Yes), the second starting up preparation control is performed (step #06), and then the starting up instruction unit 77 gives a starting up instruction with respect to the internal combustion engine E (step #08).

In a case where in the determination in step #03, the rotation speed when the starting up condition is established is included within the specific rotation speed range (step #03: Yes), the third staring up preparation control is performed (step #07), and then the starting up instruction unit 77 gives a starting up instruction with respect to the internal combustion engine E (step #08).

1-6-2. Procedure of First Starting Up Preparation Control

Next, description will be made with respect to a procedure of the first starting up preparation control in step #05 with reference to FIG. 9. The starting up target value setting unit 72 acquires vehicle speed information (step #10), and sets the starting up target value Ni to a rotation speed of the first rotating electrical machine MG 1, which allows the rotation speed at the time of direct connection of the internal combustion engine E to be the starting up rotation speed Nf, based on the vehicle speed information (step #11). In addition, as the vehicle speed information, the vehicle speed information acquired to perform the determination in step #03 may be used. In addition, a control to change the rotation speed of the first rotating electrical machine MG1 is performed by the rotation speed feedback control in this example with the starting up target value Ni made as a target value (step #12).

The non-synchronization engagement control unit 75 increases the transmission torque capacity of the frictional engagement device CL in a state in which the rotation speed of the first rotating electrical machine MG1 reaches the starting up target value Ni by the performing of step #12, and allows the frictional engagement device CL to be the slip engagement state (step #13). Until the frictional engagement device CL becomes the direct engagement state (step #14: No), the frictional engagement device CL becomes the slip engagement state. In addition, the difference in the rotation speed between the two engagement members of the frictional engagement device CL decreases, and when the frictional engagement device CL becomes the direct engagement state (step #14: Yes), the non-synchronization engagement control unit 75 performs a control to allow the frictional engagement device CL to be the normal direct engagement state (step #15), and then the first starting up preparation control is terminated.

1-6-3. Procedure of Second Starting Up Preparation Control

Next, description will be made with respect to a procedure of the second starting up preparation control in step #6 with reference to FIG. 10. The starting up target value setting unit 72 acquires vehicle speed information (step #20), and sets the starting up target value Ni to the synchronization rotation speed Ns that is a rotation speed of the first rotating electrical machine MG1, which allows the two engagement members of the frictional engagement device CL to be the synchronization state, based on the vehicle speed information (step #21). In addition, as the vehicle speed information, the vehicle speed information acquired to perform the determination in step #03 may be used. In addition, a control to change the rotation speed of the first rotating electrical machine MG1 is performed by the rotation speed feedback control in this example with the starting up target value Ni made as a target value (step #22).

The synchronization engagement control unit 74 increases the transmission torque capacity of the frictional engagement device CL in a state in which the rotation speed of the first rotating electrical machine MG1 reaches the starting up target value Ni by the performing of step #22, and allows the frictional engagement device CL to be the normal direct engagement state (step #23).

When the frictional engagement device CL becomes the direct engagement state by the performing of step #23, the control device 70 sets the starting up target value Nj after synchronization engagement to the rotation speed of the first rotating electrical machine MG1, which allows the rotation speed of the internal combustion engine E to be the starting up rotation speed Nf (step #24). In addition, a control to change the rotation speed of the first rotating electrical machine MG1 with the starting up target value Nj after synchronization engagement made as a target value by using the rotation speed feedback control in this example (step #25). When the rotation speed of the first rotating electrical machine MG1 reaches the starting up target value Nj after the synchronization engagement, the second starting up preparation control is terminated.

1-6-4. Procedure of Third Starting Up Preparation Control

Next, description will be made with respect to a procedure of the third starting up preparation control in step #07 with reference to FIG. 11. The starting up target value setting unit 72 sets the rotation speed when the staring up condition is established to the starting up target value Ni (step #30), and controls the rotation speed of the first rotating electrical machine MG1 with the starting up target value Ni made as a target value (step #31). In addition, in this case, since the rotation speed when the starting up condition is established, which is a current rotation speed of the first rotating electrical machine MG1, is equal to the starting up target value Ni, in a control in step #31, a control to maintain the rotation speed of the first rotating electrical machine MG1 is performed.

Next, non-synchronization engagement control unit 75 increases the transmission torque capacity of the frictional engagement device CL to allow the frictional engagement device CL to be the slip engagement state (step #32). Until the frictional engagement device CL becomes the direct engagement state (step #33: No), the frictional engagement device CL becomes the slip engagement state. In addition, the difference in the rotation speed between the two engagement members of the frictional engagement device CL decreases, and when the frictional engagement device CL becomes the direct engagement state (step #33: Yes), the non-synchronization engagement control unit 75 performs a control to allow the frictional engagement device CL to be the normal direct engagement state (step #34), and then the third starting up preparation control is terminated.

2. Second Embodiment

Figure 12:
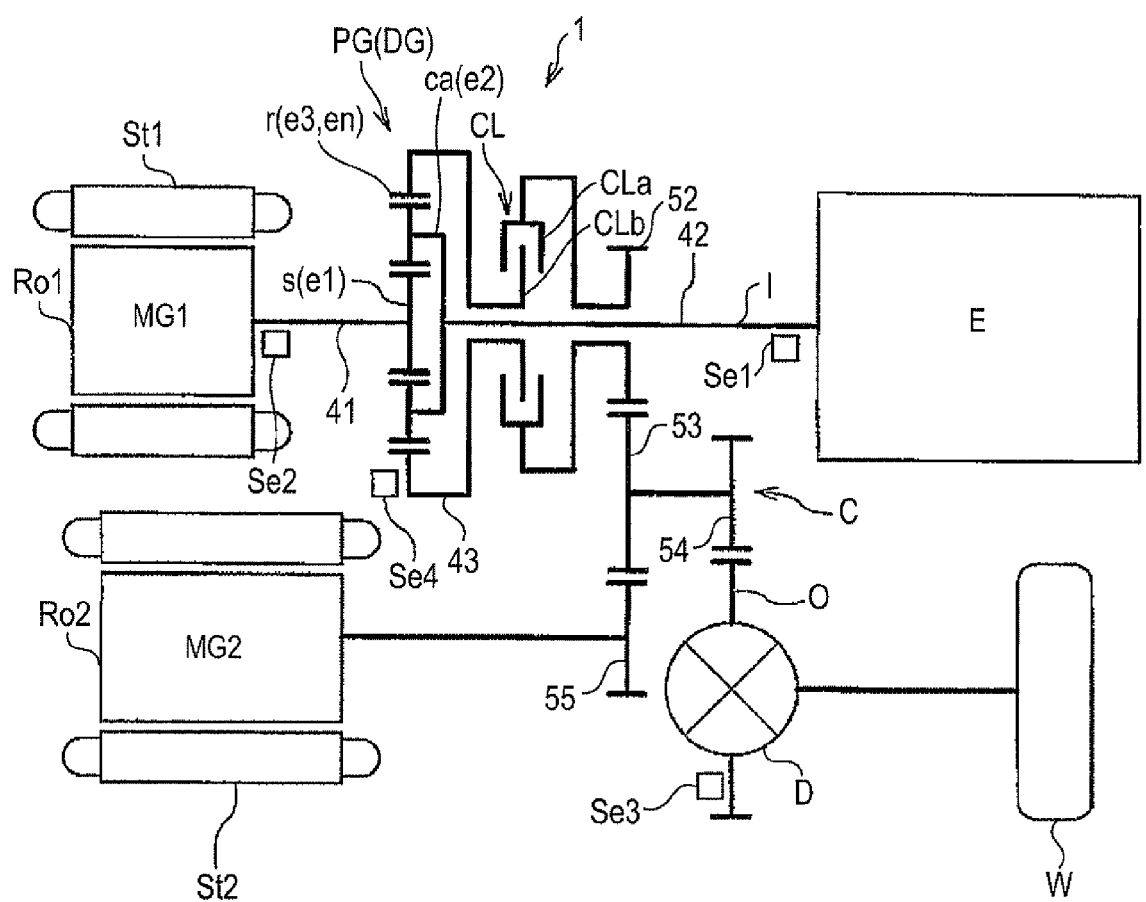
FIG. 12 is a skeleton diagram illustrating a mechanical configuration of a driving device for a vehicle according to a second embodiment of the invention.

Next, a second embodiment of the driving device for a vehicle according to the invention will be described with reference to FIGS. 12 and 13. As shown in FIG. 12, the driving device 1 for a vehicle according to this embodiment is configured basically with the same configuration as the first embodiment except for an arrangement position of the frictional engagement device CL. Hereinafter, a configuration of the driving device 1 for a vehicle according to this embodiment will be mainly described based on the differences from the first embodiment. In addition, it is assumed that configurations not specifically described are the same as the first embodiment.

As shown in FIG. 12, in the driving device 1 for a vehicle according to this embodiment, the frictional engagement device CL is provided at a power transmission path between the output member O and the rotational element (the third rotational element e3) of the differential gear unit DG, not between the input member I and the rotational element (the second rotational element e2) of the differential gear unit DG. Therefore, the frictional engagement device CL is provided in such a manner that the differential gear unit DG can release the connection in a driving manner between the output member O and the rotational element (the third rotational element e3) of the differential gear unit DG.

Specifically, the counter drive gear 52 is connected in a driving manner to the first engagement member CLa that is one engagement member of the frictional engagement device CL to rotate integrally therewith, and the third rotational element connecting member 43 is connected in a driving manner to the second engagement member CLb that is the other engagement member to rotate integrally therewith. Therefore, the frictional engagement device CL is located at a power transmission path between the second rotating electrical machine MG2 and the rotational element (the third rotational element e3) of the differential gear unit DG, and when the frictional engagement device CL is made to be released state, the connection in a driving manner between the second rotating electrical machine MG2 and the rotational element (the third rotational element e3) of the differential gear unit DG is released, in addition to the output member O.

In this embodiment, since the rotational element en that is an object to be released is the ring gear r, as shown in FIG. 12, the sensor Se4 for a rotational element that is an object to be released is disposed to detect a rotation speed of the ring gear r. In addition, in this embodiment, since the input member I is connected in a driving manner to the second rotational element connecting member 42 to rotate integrally therewith, the rotation speed of the carrier ca is always equal to the rotation speed of the internal combustion engine E.

Figure 13:
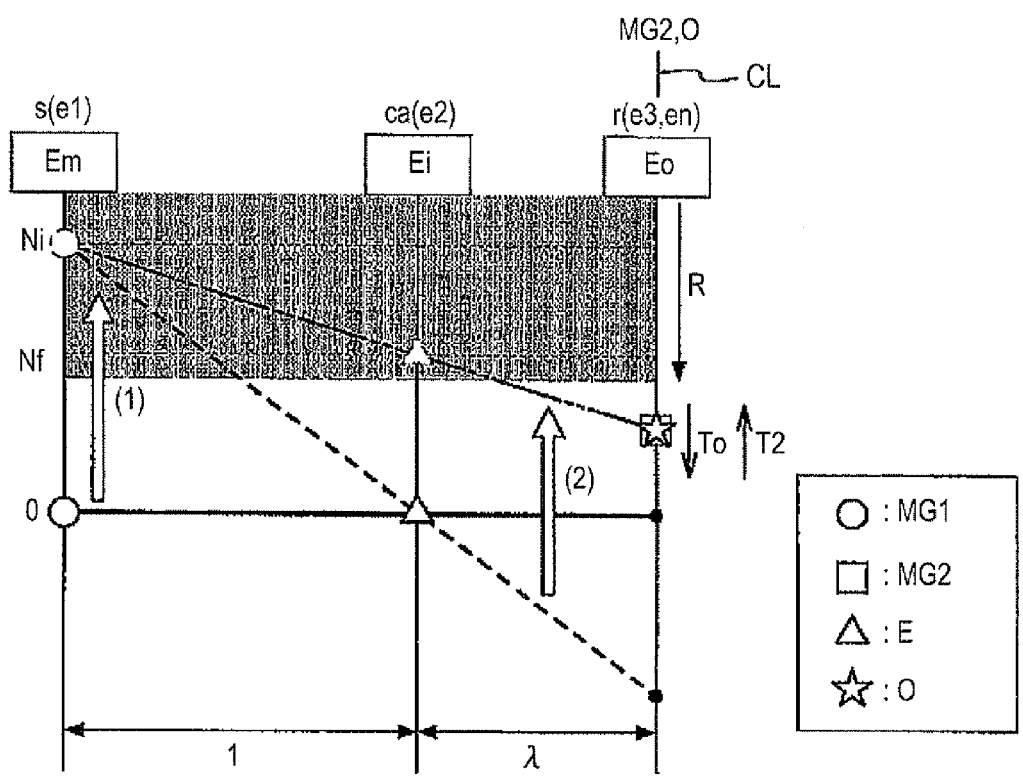
FIG. 13 is a speed diagram illustrating an operation of a first starting up preparation control according to the second embodiment of the invention.

FIG. 13 shows a speed diagram illustrating an operation of the first starting up preparation control (the rotation speed control and non-synchronization engagement control) that is executed by the driving device 1 for a vehicle according to this embodiment. As indicated by a solid line in FIG. 13, in a state in which a vehicle travels in an electric driving mode, the frictional engagement device CL enters a released state, and the ring gear r is detached from the output member O and the second rotating electrical machine MG2 and therefore becomes a freely rotatable state. In addition, since the internal combustion engine E is in a stopped state, the rotation speed thereof becomes zero, and since the first rotating electrical machine MG1 is controlled in such a manner that the rotation speed and output torque thereof become zero, the rotation speed of the ring gear r becomes zero.

In addition, when the internal combustion engine E is attempted to be started up from a state indicated by a solid line in FIG. 13, the rotation speed control unit 71 performs the rotation speed control with the starting up target value Ni, which is set by the starting up target value setting unit 72, made as a target value. Specifically, the first rotating electrical machine MG1 outputs positive direction torque and therefore the rotation speed thereof increases, and along with this, the rotation speed of the ring gear r decreases (a process indicated by an arrow (1) in FIG. 13). A broken line in FIG. 13 illustrates a state in which the rotation speed of the first rotating electrical machine MG1 reaches the starting up target value Ni by the performing of the rotation speed control.

In addition, the non-synchronization engagement control (process indicated by an arrow (2) in FIG. 13) is performed in a state in which the rotation speed of the first rotating electrical machine MG1 reaches the starting up target value Ni that is a target value. At this time, since the rotation speed of the first rotating electrical machine MG1 is maintained to the starting up target value Ni, the rotation speed of the ring gear r may increase to the rotation speed of the output member O, and along with this, the rotation speed of the internal combustion engine E that rotates integrally with the carrier ca also increases. In addition, when the frictional engagement device CL becomes the direct engagement state, the rotation speed of the internal combustion engine E reaches the starting up rotation speed Nf. Then, the starting up instruction unit 77 gives a starting up instruction with respect to the internal combustion engine E.

In addition, although not shown, in a case where the rotation speed when the starting up condition is established is not included within the specific rotation speed range, and in a case where the internal combustion engine request torque is less than the request determination threshold value that is determined in advance, as is the case with the first embodiment, the second starting up preparation control is performed. That is, when the target rotation speed of the first rotating electrical machine in the rotation speed control is set to the synchronization rotation speed Ns, and the rotation speed of the first rotating electrical machine MG1 reaches the synchronization rotation speed Ns that is a target value by the performing of the rotation speed control, the synchronization engagement control is performed. In addition, after the frictional engagement device CL becomes the direct engagement state, in a state in which the rotation speed of the first rotating electrical machine MG1 is controlled with the starting up target value Nj after synchronization engagement made as a target value, and thereby the rotation speed of the first rotating electrical machine MG1 reaches the starting up target value Nj after synchronization engagement, the starting up instruction unit 77 gives a starting up instruction with respect to the internal combustion engine E.

Although not shown, in a case where the rotation speed when the starting up condition is established is included within the specific rotation speed range, as is the case with the first embodiment, the third starting up preparation control is performed. That is, the target rotation speed of the first rotating electrical machine MG1 in the rotation speed control is set to the rotation speed when the starting up condition is established. In addition, in a state in which the frictional engagement device CL becomes the direct engagement state by the performing of the non-synchronization engagement control, and the rotation speed of the internal combustion engine E reaches the rotation speed (for example, the starting up rotation speed NO within the startable rotation speed range R, the starting up instruction unit 77 gives a starting up instruction with respect to the internal combustion engine E.

3. Third Embodiment

Figure 14:
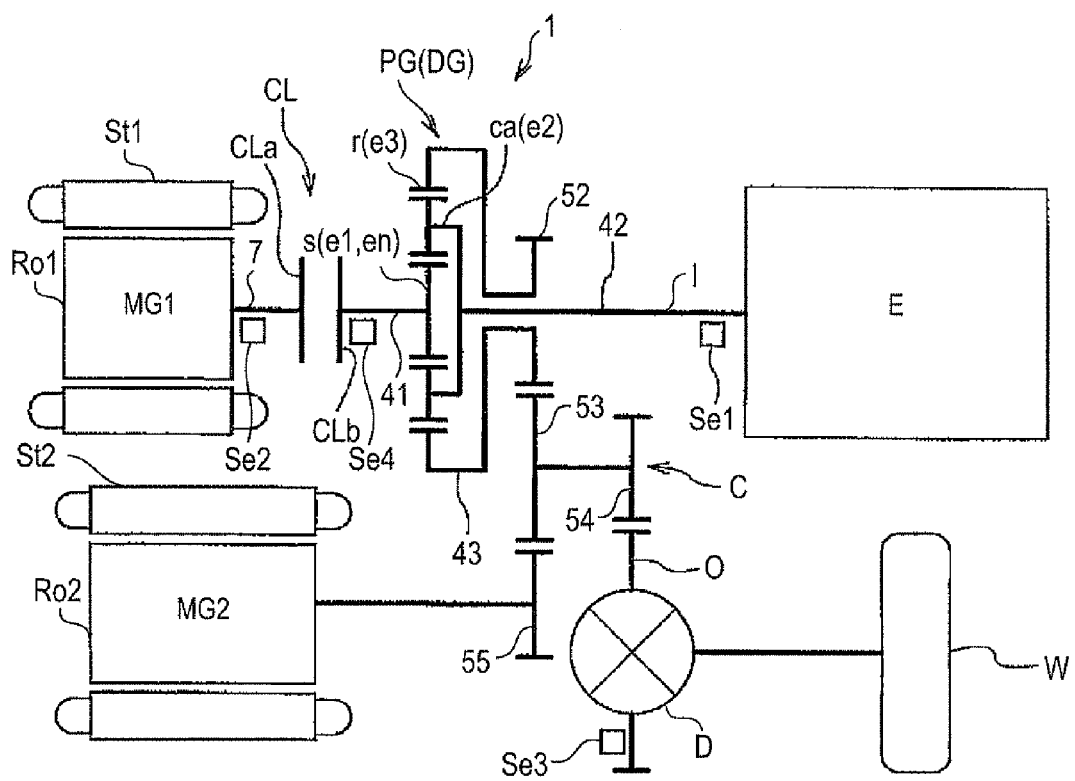
FIG. 14 is a skeleton diagram illustrating a mechanical configuration of a driving device for a vehicle according to a third embodiment of the invention.

Next, a third embodiment of the driving device for a vehicle according to the invention will be described with reference to FIGS. 14 and 15. As shown in FIG. 14, the driving device 1 for a vehicle according to this embodiment is configured basically with the same configuration as the first embodiment except for an arrangement position of the frictional engagement device CL. Hereinafter, a configuration of the driving device 1 for a vehicle according to this embodiment will be mainly described based on the differences from the first embodiment. In addition, it is assumed that configurations not specifically described are the same as the first embodiment.

As shown in FIG. 14, the driving device 1 for a vehicle according to this embodiment, the frictional engagement device CL is provided at a power transmission path between the first rotating electrical machine MG1 and the rotational element (the first rotational element e1) of the differential gear unit DG, not between the input member I and the rotational element (the second rotational element e2) of the differential gear unit DG. Therefore, the frictional engagement device CL is provided in such a manner that the differential gear unit DG can release the connection in a driving manner between the first rotating electrical machine MG1 and the rotational element (the first rotational element e1) of the differential gear unit DG.

Figure 17:
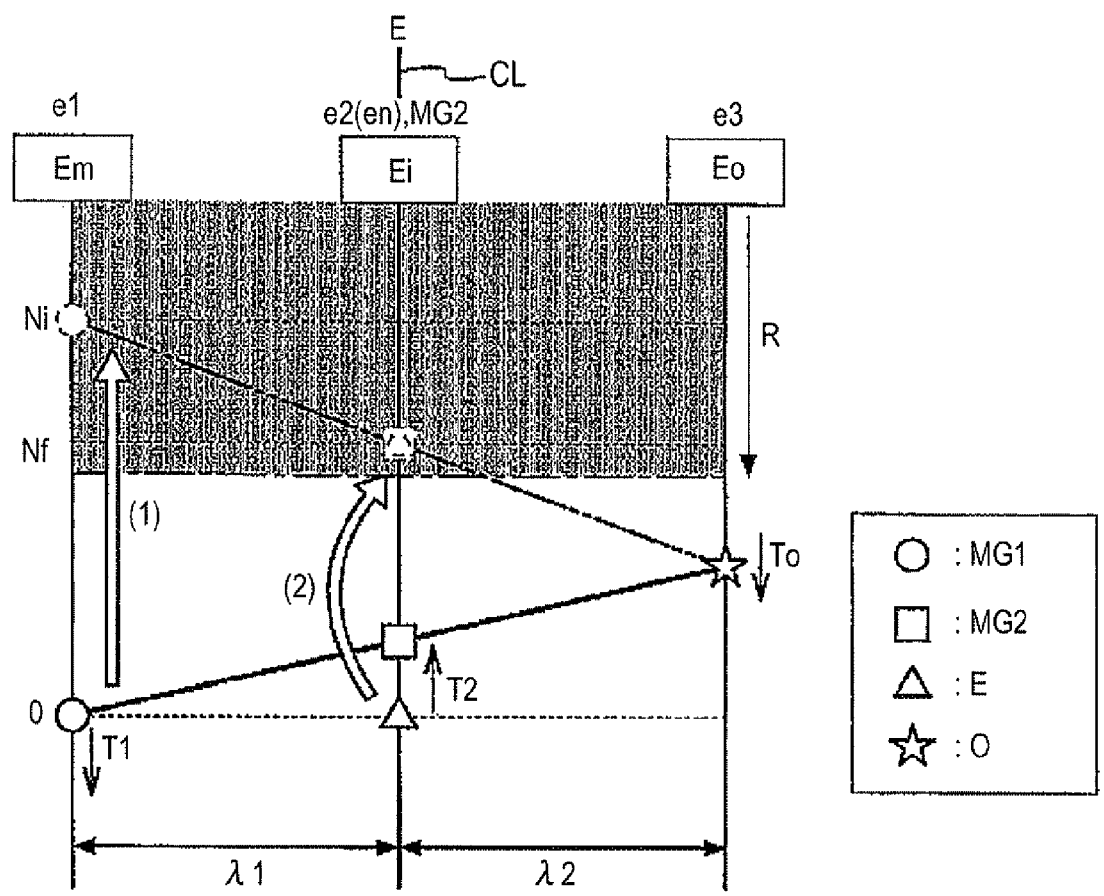
FIG. 17 is a speed diagram illustrating an operation of a first starting up preparation control according to other embodiment of the invention.

Specifically, a first rotor shaft 7 of the first rotating electrical machine MG1 is connected in a driving manner to the first engagement member CLa that is one engagement member of the frictional engagement device CL to rotate integrally therewith, and the first rotational element connecting member 41 is connected in a driving manner to the second engagement member CLb that is the other engagement member of the frictional engagement device CL to rotate integrally therewith. In this embodiment, since the rotational element en that is an object to be released is the sun gear s, as shown in FIG. 17, the sensor Se4 for a rotational element that is an object to be released is disposed to detect a rotation speed of the sun gear s. In addition, in this embodiment, since the input member I is connected in a driving manner to the second rotational element connecting member 42 to rotate integrally therewith, the rotation speed of the carrier ca is always equal to the rotation speed of the internal combustion engine E.

Figure 15:
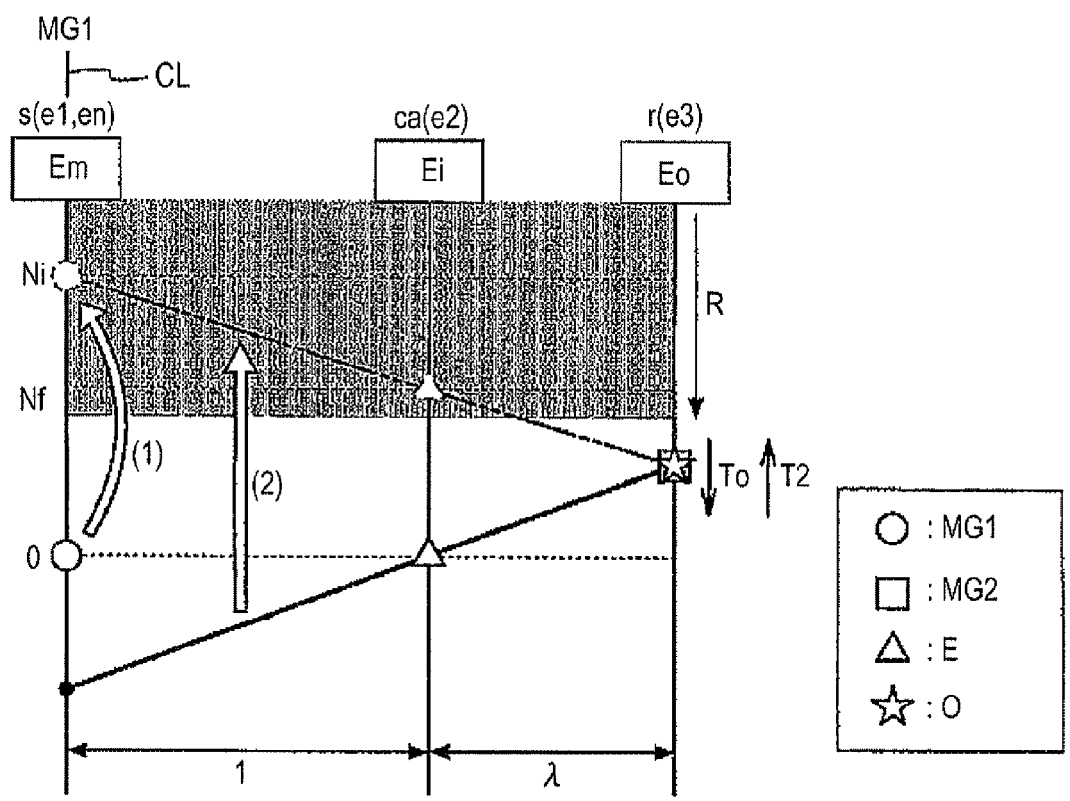
FIG. 15 is a speed diagram illustrating an operation of a first starting up preparation control according to the third embodiment of the invention.

FIG. 15 shows a speed diagram illustrating operations of the first starting up preparation control (the rotation speed control and non-synchronization engagement control) that is executed by the driving device 1 for a vehicle according to this embodiment. As indicated by a solid line in FIG. 15, in a state in which a vehicle travels in an electric traveling mode, the frictional engagement device CL enters a released state, and the sun gear s is detached from the first rotating electrical machine MG1 and therefore becomes a freely rotatable state. In addition, since the internal combustion engine E is in a stopped state, the rotation speed thereof becomes zero, and the sun gear s rotates at a rotation speed determined based on the rotation speed (determined in response to a vehicle speed) of the ring gear r. At this time, the first rotating electrical machine MG1 is controlled in such a manner that the rotation speed and output torque thereof become zero.

In addition, when the internal combustion engine E is attempted to be started up from a state indicated by a solid line in FIG. 15, the rotation speed control unit 71 performs the rotation speed control with the starting up target value Ni, which is set by the starting up target value setting unit 72, made as a target value. Specifically, the first rotating electrical machine MG1 outputs positive direction torque and therefore the rotation speed thereof increases (a process indicated by an arrow (1) in FIG. 15). A circle of a broken line in FIG. 15, which indicates the first rotating electrical machine MG1, represents a state in which the rotation speed of the first rotating electrical machine MG1 reaches the starting up target value Ni by the performing of the rotation speed control. In addition, when the vehicle speed is constant, the rotation speed of the sun gear s during performing this rotation speed control becomes constant.

In addition, the non-synchronization engagement control (a process indicated by an arrow (2) in FIG. 15) is performed in a state in which the rotation speed of the first rotating electrical machine MG1 reaches the starting up target value Ni that is a target value. At this time, since the rotation speed of the first rotating electrical machine MG1 is maintained to the starting up target value Ni, the rotation speed of the sun gear s may increase to the rotation speed of the first rotating electrical machine MG1, and along with this, the rotation speed of the internal combustion engine E that rotates integrally with the carrier ca also increases. In addition, when the frictional engagement device CL becomes the direct engagement state, the rotation speed of the internal combustion engine E reaches the starting up rotation speed Nf. Then, the starting up instruction unit 77 gives a starting up instruction with respect to the internal combustion engine E. Although description is omitted, the second staring up preparation control and third starting up preparation control are also performed similarly to the first and second embodiments.

4. Fourth Embodiment

In the above-described first, second, and third embodiments, description has been made with respect to a configuration in which the first rotating electrical machine MG1 is connected in a driving manner to the first rotational element e1, the input member I is connected in a driving manner to the second rotational element e2, and the second rotating electrical machine MG2 and the output member O are connected in a driving manner to the third rotational element e3, not through another rotational element of the differential gear unit DG, as an example. However, an embodiment of the invention is not limited thereto, and as shown in FIG. 16, it may be configured that the input member I is connected in a driving manner to the first rotational element e1, the second rotating electrical machine MG2 and the output member O are connected in a driving manner to the second rotational element e2, and the first rotating electrical machine MG1 is connected in a driving manner to the third rotational element e3.

Figure 16:
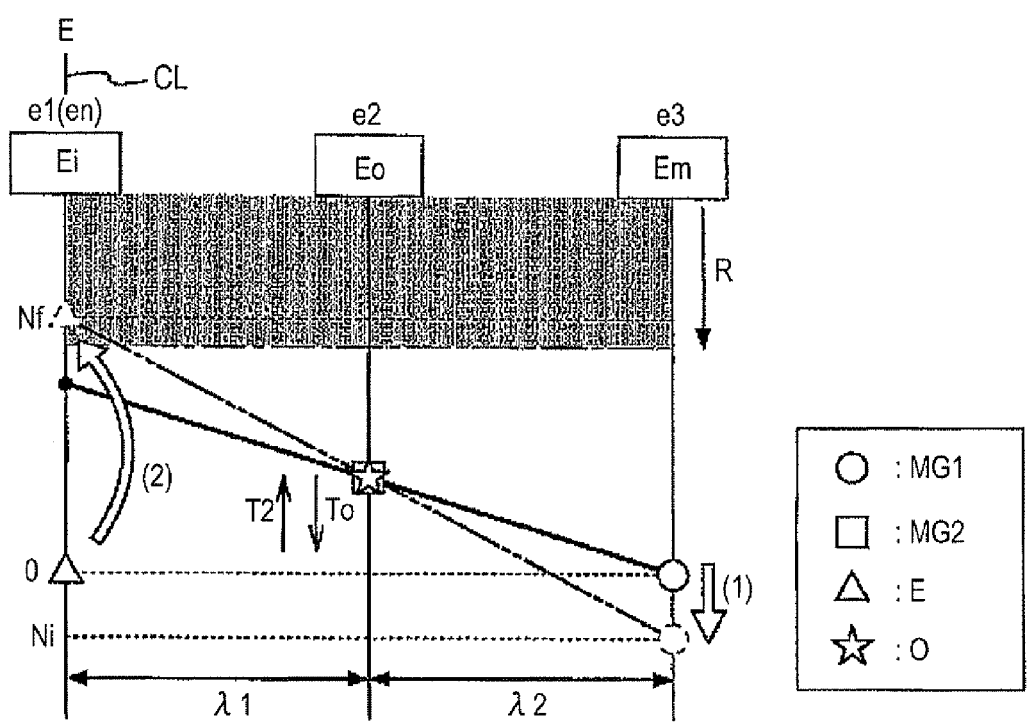
FIG. 16 is a speed diagram illustrating an operation of a first starting up preparation control according to a fourth embodiment of the invention.

In examples shown in FIG. 16, differently from the above-described first, second, and third embodiments, in the hybrid traveling mode in which traveling is performed with both output torque of the internal combustion engine E and output torque of the rotating electrical machines MG1 and MG2, basically, a torque converter mode in which torque amplified with respect to the output torque of the internal combustion engine E is transmitted to the output member O is realized. In addition, in this embodiment, as is the case with the first embodiment (FIG. 1), the frictional engagement device CL is provided at a power transmission path between the input member I and the rotational element (in this example, the first rotational element e1) of the differential gear unit DG.

FIG. 16 shows a speed diagram illustrating operations of the first starting up preparation control (the rotation speed control and non-synchronization engagement control) that is executed by the driving device 1 for a vehicle according to this embodiment. In addition, λ1 and λ2 shown in the drawing represent gear ratios of the differential gear unit DG, and these values are determined based on a gear ratio of a differential gear mechanism making up the differential gear unit DG. A notation method of the speed diagrams is the same as the above-described respective embodiments, such that detailed description thereof will not be repeated, but as shown in FIG. 16, the rotation speed control (a process indicated by an arrow (1) in FIG. 16) by the rotation speed control unit 71 is performed, and then the non-synchronization engagement control (a process indicated by an arrow (2) in FIG. 16) is performed. In addition, in this embodiment, the starting up target value Ni is uniquely determined based on the rotation speed of the output member O (in this example, the rotation speed of the second rotational element e2), the starting up rotation speed Nf, and the gear ratios λ1 and λ2 of the differential gear unit DG. The second starting up preparation control and the third starting up preparation control are performed similarly to the first, second, and third embodiments.

Although not shown, in regard to the configuration shown in FIG. 16, even in a configuration in which the frictional engagement device CL is provided at a power transmission path between the output member O and the rotational element (in this example, the second rotational element e2) of the differential gear unit DG, or a power transmission path between the first rotating electrical machine MG1 and the rotational element (in this example, the third rotational element e3) of the differential gear unit DG, instead of the power transmission path between the input member I and the rotational element of the differential gear unit DG, similarly, the first starting up preparation control, the second starting up preparation control, and the third starting up preparation control may be performed. In addition, in a configuration in which the frictional engagement device CL is provided at the power transmission path between the output member O and the rotational element (in this example, the second rotational element e2) of the differential gear unit DG, as is the case with the second embodiment, the frictional engagement device CL is configured to be located at a power transmission path between the second rotating electrical machine MG2 and the rotational element (in this example, the second rotational element e2) of the differential gear unit DG.

5. Other Embodiments

Finally, other embodiments according to the invention will be described. In addition, characteristics disclosed in each of embodiments described later are applicable to other embodiments as long as a contradiction does not occur, instead of being applicable only to the corresponding embodiment.

(1) In the above-described respective embodiments, description has been made with respect to a configuration in which the second rotating electrical machine MG2 is connected in a driving manner to the rotational element, to which the output member O is connected in a driving manner, of the differential gear unit DG, not through another rotational element of the differential gear unit DG as an example. However, an embodiment of the invention is not limited thereto, the second rotating electrical machine MG2 may be configured to be connected in a driving manner to the rotational element other than the rotational element, to which the output member O is connected in a driving manner, of the differential gear unit DG, not through another rotational element of the differential gear unit DG.

As this configuration, for example, as shown in FIG. 17, the first rotating electrical machine MG1 may be connected in a driving manner to the first rotational element e1, the input member I and the second rotating electrical machine MG2 are connected in a driving manner to the second rotational element e2, and output member O is connected in a driving manner to the third rotational element e3, not through another rotational element of the differential gear unit DG. In this configuration, the frictional engagement device CL is provided at a power transmission path between the input member I and the rotational element (in this example, the second rotational element e2), to which the input member I is connected in a driving manner not through another rotational element, of the differential gear unit DG, but the frictional engagement device CL is not provided at a power transmission path between the second rotating electrical machine MG2 and the rotational element (in this example, the second rotational element e2) of the differential gear unit DG. In this configuration, as is the case with the above-described respective embodiments, the first starting up preparation control may be performed by performing the non-synchronization engagement control (a process indicated by an arrow (2) in FIG. 17) after performing the rotation speed control (a process indicated by an arrow (1) in FIG. 17).

In addition, although not shown, as the configuration in which the second rotating electrical machine MG2 is connected in a driving manner to the rotational element other than the rotational element, to which the output member O is connected in a driving manner, of the differential gear unit DG, not through another rotational element of the differential gear unit DG, in regard to the configuration shown in FIG. 16, the second rotating electrical machine MG2 may be configured to be connected in a driving manner to the first rotational element e1 instead of the second rotational element e2. In this case, the frictional engagement device CL is provided at a power transmission path between the input member I and the rotational element (in this example, the first rotational element e1), to which the input member I is connected in a driving manner not through another rotational element, of the differential gear unit DG, but the frictional engagement device CL is not provided at a power transmission path between the second rotating electrical machine MG2 and the rotational element (in this example, the first rotational element e1) of the differential gear unit DG.

(2) In the above-described respective embodiments, description has been made with respect to a configuration in which basically, the rotation speed of the output member O is set to be a positive direction like the rotation speed of the internal combustion engine E when the hybrid traveling mode in which the traveling is made by the output torque of the internal combustion engine E is executed, as an example. However, an embodiment of the invention is not limited to this, and for example, as shown in FIG. 18, when the hybrid traveling mode in which the traveling is made by the output torque of the internal combustion engine E is executed, basically, the rotation speed of the output member O may be set to be the negative direction, differently from the rotation speed of the internal combustion engine E.

Figure 18:
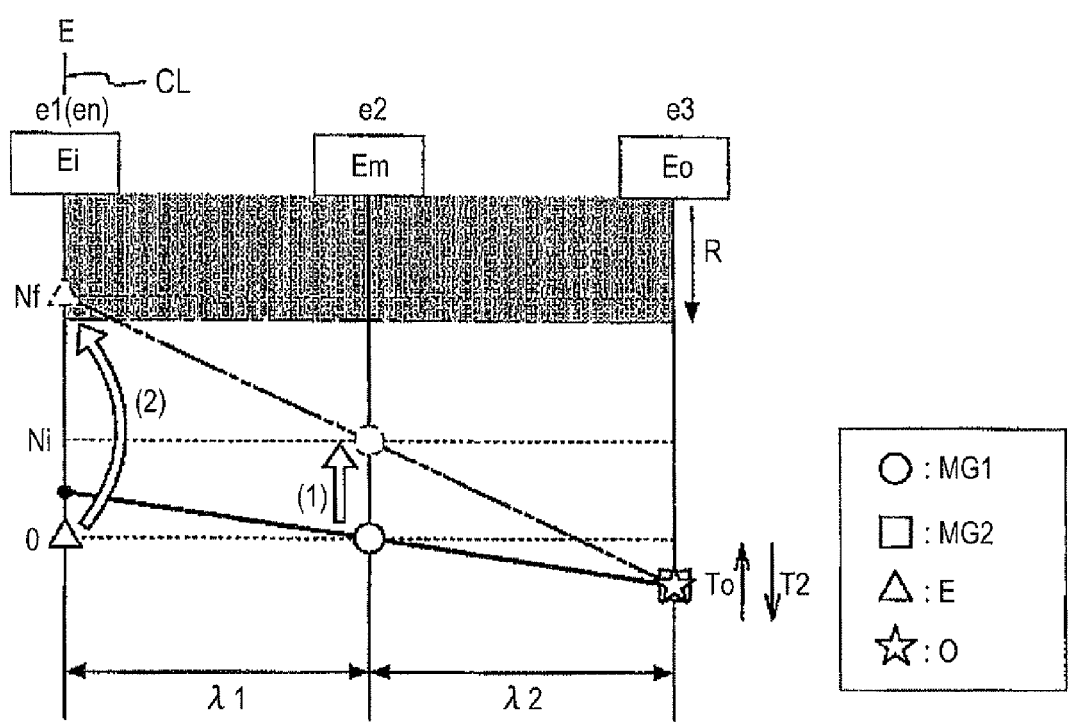
FIG. 18 is a speed diagram illustrating an operation of a first starting up preparation control according to other embodiment of the invention.

In a configuration shown in FIG. 18, the input member I is connected in a driving manner to the first rotational element e1, the first rotating electrical machine MG1 is connected in a driving manner to the second rotational element e2, and the second rotating electrical machine MG2 and the output member O are connected in a driving manner to the third rotational element e3, not through another rotational element of the differential gear unit DG. In addition, the frictional engagement device CL is provided at a power transmission path between the input member I and the rotational element (in this example, the first rotational element e1), to which the input member I is connected in a driving manner not through another rotational element, of the differential gear unit DG. In this configuration, as is the case with the above-described respective embodiments, the first starting up preparation control may be performed by performing the non-synchronization engagement control (a process indicated by an arrow (2) in FIG. 18) after performing the rotation speed control (a process indicated by an arrow (1) in FIG. 18).

Although not shown, in regard to the configuration shown in FIG. 18, the frictional engagement device CL may be configured to be provided at a power transmission path between the first rotating electrical machine MG1 and the rotational element (in this example, the second rotational element e2) of the differential gear unit DG, or a power transmission path between the output member O and the second rotating electrical machine MG2 and the rotational element (in this example, the third rotational element e3) of the differential gear unit DG, instead of the power transmission path between the input member I and the rotational element of the differential gear unit DG.

In addition, in regard to the configuration shown in FIG. 18, the second rotating electrical machine MG2 may be configured to be connected in a driving manner to the first rotational element e1 instead of the third rotational element e3. In this case, the frictional engagement device CL is provided at a power transmission path between the input member I and the rotational element (in this example, the first rotational element e1), to which the input member I is connected in a driving manner not through another rotational element, of the differential gear unit DG, but the frictional engagement device CL is not provided at a power transmission path between the second rotating electrical machine MG2 and the rotational element (in this example, the first rotational element e1) of the differential gear unit DG.

Figure 19:
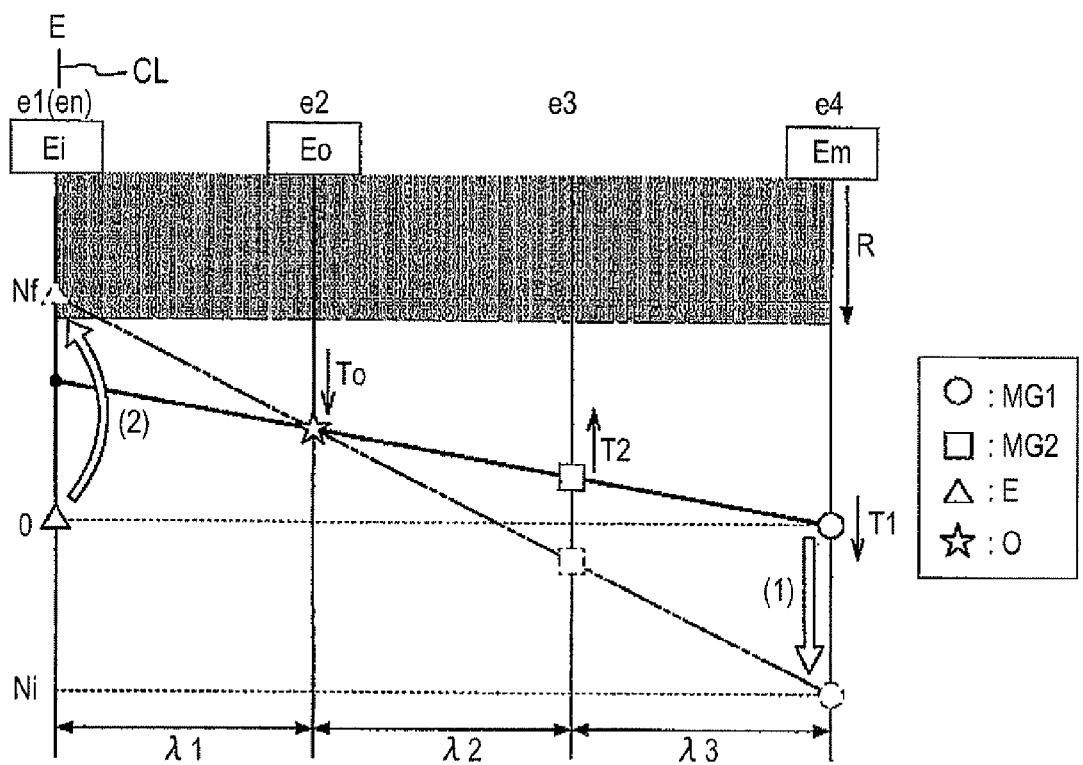
FIG. 19 is a speed diagram illustrating an operation of a first starting up preparation control according to other embodiment of the invention.
Figure 20:
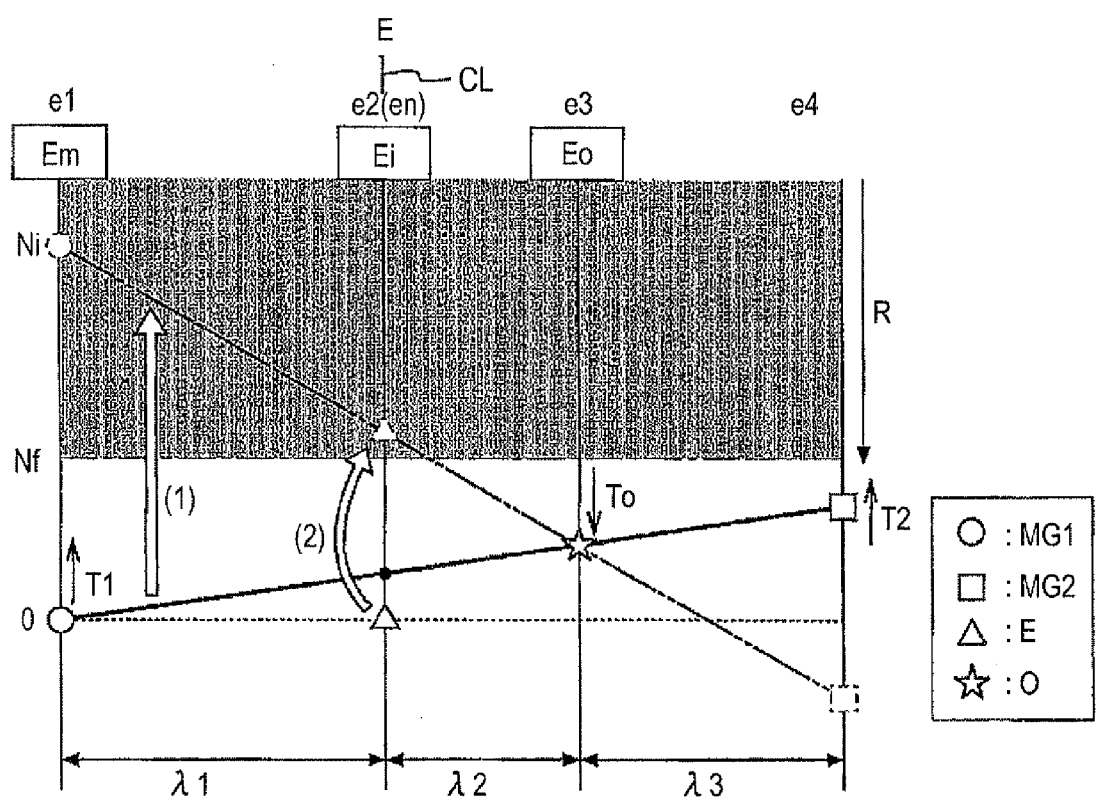
FIG. 20 is a speed diagram illustrating an operation of a first starting up preparation control according to other embodiment of the invention.
Figure 21:
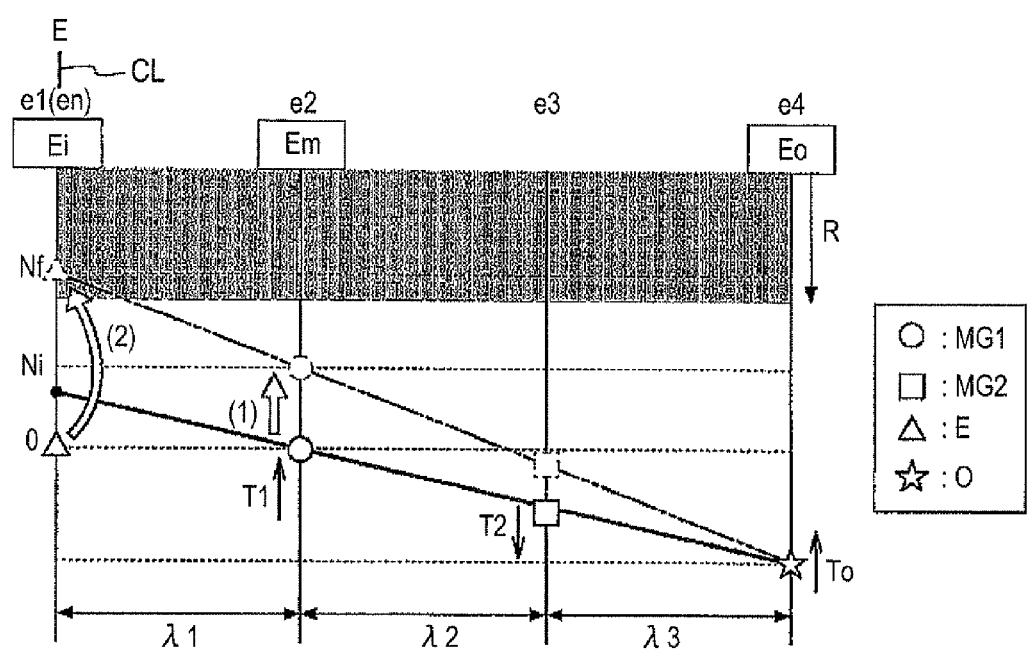
FIG. 21 is a speed diagram illustrating an operation of a first starting up preparation control according to other embodiment of the invention.

(3) In the above-described respective embodiments, description has been made with respect to a configuration in which the differential gear unit DG includes three rotational elements, as an example. However, an embodiment of the invention is not limited thereto, and the differential gear unit DG may be configured to include four or more rotational elements. For example, as shown in FIGS. 19 to 21, the differential gear unit DG may be configured to include four rotational elements of a first rotational element e1, a second rotational element e2, a third rotational element e3, and a fourth rotational element e4 in the order of rotation speed. In addition, $\lambda 1$, $\lambda 2$, and $\lambda 3$ shown in FIGS. 19 to 21 represents gear ratios of the differential gear unit DG, and these values are determined based on a gear ratio of a differential gear mechanism making up the differential gear unit DG. In addition, in this embodiment, the starting up target value Ni is uniquely determined based on the rotation speed of the output member O, the starting up rotation speed Nf, and the gear ratios $\lambda 1$, $\lambda 2$, and $\lambda 3$ of the differential gear unit DG.

In examples illustrated in FIGS. 19 to 21, the input member I, the output member O, the first rotating electrical machine MG1, and the second rotating electrical machine MG2 are connected in a driving manner to the rotational elements, which are different from each other, of the differential gear unit DG, not through another rotational element of the differential gear unit DG. That is, in the examples illustrated in FIGS. 19 to 21, differently from the above-described respective embodiments, the second rotating electrical machine MG2 is connected in a driving manner to the rotational element other than the rotational elements, to which the input member I, the output member O, and the first rotating electrical machine MG1 are connected in a driving manner, of the differential gear unit DG, not through another rotational element of the differential gear unit DG.

Specifically, in an example shown in FIG. 19, the input member I is connected in a driving manner to the first rotational element e1, the output member O is connected in a driving manner to the second rotational element e2, the second rotating electrical machine MG2 is connected in a driving manner to the third rotational element e3, and the first rotating electrical machine MG1 is connected in a driving manner to the fourth rotational element e4, not through another rotational element of the differential gear unit DG. In addition, in an example illustrated in FIG. 20, the first rotating electrical machine MG1 is connected in a driving manner to the first rotational element e1, the input member I is connected in a driving manner to the second rotational element e2, the output member O is connected in a driving manner to the third rotational element e3, and the second rotating electrical machine MG2 is connected in a driving manner to the fourth rotational element e4, not through another rotational element of the differential gear unit DG. In addition, in an example shown in FIG. 21, the input member I is connected in a driving manner to the first rotational element e1, the first rotating electrical machine MG1 is connected in a driving manner to the second rotational element e2, the second rotating electrical machine MG2 is connected in a driving manner to the third rotational element e3, and the output member O is connected in a driving manner to the fourth rotational element e4, not through another rotational element of the differential gear unit DG.

In the examples shown in FIGS. 19 to 21, the frictional engagement device CL is provided at the power transmission path between the input member I and the rotational element, to which the input member I is connected in a driving manner not through another rotational element, of the differential gear unit DG. In addition, even in this configuration, as is the case with the above-described respective embodiments, the first starting up preparation control may be performed by performing the non-synchronization engagement control (a process indicated by an arrow (2) in each drawing) after performing the rotation speed control (a process indicated by an arrow (1) in each drawing).

In addition, a configuration in which the differential gear unit DG includes four rotational elements is not limited to the examples shown in FIGS. 19 to 21, and in regard to the configurations shown in FIGS. 19 to 21, a configuration in which an order of two rotational elements is switched is also possible. For example, in regard to the configuration shown in FIG. 19, the second rotational element e2 and the third rotational element e3 may be configured to be substituted with each other. In addition, in the configuration shown in FIG. 20, the third rotational element e3 and the fourth rotation element e4 may be configured to be substituted with each other. In addition, in the configuration shown in FIG. 20, the second rotational element e2 and the third rotational element e3 may be configured to be substituted with each other, after the third rotation element e3 and the fourth rotational element e4 are substituted with each other.

(4) In the above-described respective embodiments, description has been made with respect to a configuration in which even in a case where the rotation speed of the internal combustion engine E at the time of direct connection is not equal to the starting up rotation speed Nf, in a case where the rotation speed when the starting up condition is established is included within the specific rotation speed range, the rotation speed when the starting up condition is established is set to the starting up target value Ni, and the third starting up preparation control is performed, as an example. However, an embodiment of the invention is not limited thereto, and even in a case where the rotation speed when the starting up condition is established is included within the specific rotation speed range, in a case where the rotation speed of the internal combustion engine E at the time of direct connection is not equal to the starting up rotation speed Nf, the starting up target value Ni may be set based on the first setting method, and the first starting up preparation control may be performed. In addition, even in a case where the rotation speed when the starting up condition is established is included within the specific rotation speed range, in a case where the internal combustion engine request torque is less than the request determination threshold value, the starting up target value Ni may be set based on the second setting method, and the second starting up preparation control may be performed.

(5) In the above-described respective embodiments, description has been made with respect to a configuration in which in a case where the rotation speed when the starting up condition is established is not included within the specific rotation speed range, and in a case where the internal combustion engine request torque is less than the request determination threshold value that is determined in advance, the second starting up preparation control is performed, as an example. However, an embodiment of the invention is not limited thereto, and the first starting up preparation control or the third starting up preparation control may be always performed regardless of a magnitude of the internal combustion engine request torque.

(6) In the above-described first, second, and third embodiments, description has been made with respect to a configuration in which the differential gear unit DG is configured by the planetary gear mechanism PG of a single-pinion type, as an example. However, an embodiment of the invention is not limited thereto, and the differential gear unit DG may be configured by a double-pinion-type planetary gear mechanism or a Ravigneaux-type planetary gear mechanism. In addition, even in the respective embodiments (excluding the first, second, and third embodiments) in which a specific configuration of the differential gear unit DG is not illustrated, as a configuration of the differential gear unit DG, an arbitrary mechanism may be adopted. For example, the differential gear unit DG including four or more rotational elements may use a configuration in which some rotational elements of the planetary gear mechanism of two sets or more are connected to each other, or the like.

(7) In the above-described respective embodiments, description has been made with respect to a configuration in which the frictional engagement device CL is configured by a frictional engagement device that operates by hydraulic pressure, as an example. However, an embodiment of the invention is not limited thereto, and an electromagnetic-type frictional engagement device in which an engagement pressure is controlled in response to an electromagnetic force may be adopted as the frictional engagement device CL.

(8) In the above-described respective embodiments, description has been made with respect to a configuration in which the internal combustion engine control unit 3 is provided separately from the control device 70, as an example. However, an embodiment of the invention is not limited thereto, and a configuration in which the internal combustion engine control unit 3 is unified to the control device 70 is possible. In addition, the allocation of the functional units described in the respective embodiments is a simple example, and a combination of a plurality of functional units or a further classification of one functional unit is possible.

(9) In regard to the above-described other configurations, embodiments disclosed in this specification are illustrative only in all aspects, and an embodiment of the invention is not limited thereto. That is, of course, configurations obtained by appropriately modifying some configurations not described in the claims belong to the technical scope of the invention as long as the configurations described in the claims of the present application and configurations equivalent to these are provided.

The invention may be appropriately used as a driving device for a vehicle, which includes an input member that is connected in a driving manner to an internal combustion engine, an output member that is connected in a driving manner to wheels, a first rotating electrical machine, a second rotating electrical machine, a differential gear unit having at least three rotational elements, and a control device.

What is claimed is:

1. A driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device, wherein the input member, the output member, and the first rotating electrical machine are connected in a driving manner to the rotational elements, which are different from each other, of the differential gear unit, not through another rotational element of the differential gear unit;

the second rotating electrical machine is connected in a driving manner to one of the rotational elements of the differential gear unit other than the rotational element to which the first rotating electrical machine is connected in a driving manner, not through another rotational element of the differential gear unit;

the driving device includes a frictional engagement device that is capable of releasing the connection in a driving manner between any of the input member, the output member, and the first rotating electrical machine, and the rotational elements of the differential gear unit;

the control device includes, a rotation speed control unit that sets a starting up target value that is a target value of rotation speed of the first rotating electrical machine and performs a rotation speed control to allow the rotation speed of the first rotating electrical machine to be equal to the starting up target value, when the frictional engagement device enters a released state and an internal combustion engine starting up condition, under which the internal combustion engine is started up from a state in which the internal combustion engine is stopped, is established, an engagement control unit that performs a non-synchronization engagement control that allows the frictional engagement device to engage, in a non-synchronization state in which a difference in the rotation speed between the two engagement members, which engage with each other, of the frictional engagement device is equal to or greater than a threshold value of a differential rotation, on condition of the performing of rotation speed control, and that allows the frictional engagement device to be a direct engagement state that is an engagement state in which the differential rotation is not present between the two engagement members, and a starting up instruction unit that gives a starting up instruction with respect to the internal combustion engine on condition of being in the direct engagement state;

the rotation speed control unit sets the starting up target value in such a manner that a rotation speed at the time of a direct connection, which is a rotation speed of the internal combustion engine at the time of being in the direct engagement state, becomes a starting up rotation speed that is set within a startable rotation speed range that is a rotation speed range in which the internal combustion engine may be started up.

2. The driving device for a vehicle according to claim 1, wherein the starting up rotation speed is set to a rotation speed at which the internal combustion engine may output internal combustion engine request torque that is necessary for the internal combustion engine to allow a vehicle to travel.

3. The driving device for a vehicle according to claim 2, wherein the rotation speed control unit sets the starting up target value based on a rotation speed of the output member, the starting up rotation speed, and a gear ratio of the differential gear unit.

4. The driving device for a vehicle according to claim 3, wherein in a case where a rotation speed when the starting up condition is established, which is the rotation speed of the first rotating electrical machine when the internal combustion engine starting up condition is established, is included in the rotation speed range of the first rotating electrical machine, which is to make the rotation speed at the time of direct connection be within the startable rotation speed range, the rotation speed control unit sets the rotation speed when the starting up condition is established as the starting up target value.

5. The driving device for a vehicle according to claim 4, wherein in a case where the internal combustion engine request torque, which is necessary for the internal combustion engine to allow a vehicle to travel, is less than a request determination threshold value that is determined in advance, the rotation speed control unit sets a rotation speed of the first rotating electrical machine, which allows a synchronization state in which the difference in the rotation speed between the two engagement members is less than the differential rotation threshold value, as the starting up target value, regardless of the starting up rotation speed, the engagement control unit performs a synchronization engagement control to allow the frictional engagement device to engage in the synchronization state, instead of the non-synchronization engagement control, and allows the frictional engagement device to be the direct engagement state, and the starting up instruction unit changes the rotation speed of the first rotating electrical machine with a rotation speed of the first rotating electrical machine, which allows the rotation speed of the internal combustion engine to be within the startable rotation speed range, made as a target value, and then gives a starting up instruction with respect to the internal combustion engine.

6. The driving device for a vehicle according to claim 5, wherein as the non-synchronization engagement control, the engagement control unit reduces the difference in the rotation speed between the two engagement members in a slip engagement state in which the two engagement members engage with each other with the difference in the rotation speed present therebetween, and performs a control to allow the direct engagement state on condition of being in the synchronization state in which the difference in the rotation speed between the two engagement members is less than the differential rotation threshold value.

7. The driving device for a vehicle according to claim 6, the second rotating electrical machine is connected in a driving manner to the rotational element, to which the output member is connected in a driving manner, of the differential gear unit, not through another rotational element of the differential gear unit.

8. The driving device for a vehicle according to claim 7, wherein the differential gear unit includes three rotational elements that are a first rotational element, a second rotational element, and a third rotational element in the order of rotation speed, the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

9. The driving device for a vehicle according to claim 1, wherein the second rotating electrical machine is connected to the rotational element of the differential gear unit other than the rotational element to which the first rotating electrical machine is connected in a driving manner and the rotational element to which the output member is connected in a driving manner, not through another rotational element of the differential gear unit, and the frictional engagement device is provided in a power transmission path between the input member and the rotational element, to which the input member is connected in a driving manner not through another rotational element, of the differential gear unit.

10. The driving device for a vehicle according to claim 1, wherein the rotation speed control unit sets the starting up target value based on a rotation speed of the output member, the starting up rotation speed, and a gear ratio of the differential gear unit.

11. The driving device for a vehicle according to claim 1, wherein in a case where a rotation speed when the starting up condition is established, which is the rotation speed of the first rotating electrical machine when the internal combustion engine starting up condition is established, is included in the rotation speed range of the first rotating electrical machine, which is to make the rotation speed at the time of direct connection be within the startable rotation speed range, the rotation speed control unit sets the rotation speed when the starting up condition is established as the starting up target value.

12. The driving device for a vehicle according to claim 1, wherein in a case where the internal combustion engine request torque, which is necessary for the internal combustion engine to allow a vehicle to travel, is less than a request determination threshold value that is determined in advance, the rotation speed control unit sets a rotation speed of the first rotating electrical machine, which allows a synchronization state in which the difference in the rotation speed between the two engagement members is less than the differential rotation threshold value, as the starting up target value, regardless of the starting up rotation speed, the engagement control unit performs a synchronization engagement control to allow the frictional engagement device to engage in the synchronization state, instead of the non-synchronization engagement control, and allows the frictional engagement device to be the direct engagement state, and the starting up instruction unit changes the rotation speed of the first rotating electrical machine with a rotation speed of the first rotating electrical machine, which allows the rotation speed of the internal combustion engine to be within the startable rotation speed range, made as a target value, and then gives a starting up instruction with respect to the internal combustion engine.

13. The driving device for a vehicle according to claim 1, wherein as the non-synchronization engagement control, the engagement control unit reduces the difference in the rotation speed between the two engagement members in a slip engagement state in which the two engagement members engage with each other with the difference in the rotation speed present therebetween, and performs a control to allow the direct engagement state on condition of being in the synchronization state in which the difference in the rotation speed between the two engagement members is less than the differential rotation threshold value.

14. The driving device for a vehicle according to claim 1, the second rotating electrical machine is connected in a driving manner to the rotational element, to which the output member is connected in a driving manner, of the differential gear unit, not through another rotational element of the differential gear unit.

15. The driving device for a vehicle according to claim 1, wherein the differential gear unit includes three rotational elements that are a first rotational element, a second rotational element, and a third rotational element in the order of rotation speed, the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

16. The driving device for a vehicle according to claim 2, wherein in a case where a rotation speed when the starting up condition is established, which is the rotation speed of the first rotating electrical machine when the internal combustion engine starting up condition is established, is included in the rotation speed range of the first rotating electrical machine, which is to make the rotation speed at the time of direct connection be within the startable rotation speed range, the rotation speed control unit sets the rotation speed when the starting up condition is established as the starting up target value.

17. The driving device for a vehicle according to claim 2, wherein in a case where the internal combustion engine request torque, which is necessary for the internal combustion engine to allow a vehicle to travel, is less than a request determination threshold value that is determined in advance, the rotation speed control unit sets a rotation speed of the first rotating electrical machine, which allows a synchronization state in which the difference in the rotation speed between the two engagement members is less than the differential rotation threshold value, as the starting up target value, regardless of the starting up rotation speed, the engagement control unit performs a synchronization engagement control to allow the frictional engagement device to engage in the synchronization state, instead of the non-synchronization engagement control, and allows the frictional engagement device to be the direct engagement state, and the starting up instruction unit changes the rotation speed of the first rotating electrical machine with a rotation speed of the first rotating electrical machine, which allows the rotation speed of the internal combustion engine to be within the startable rotation speed range, made as a target value, and then gives a starting up instruction with respect to the internal combustion engine.

18. The driving device for a vehicle according to claim 2, wherein as the non-synchronization engagement control, the engagement control unit reduces the difference in the rotation speed between the two engagement members in a slip engagement state in which the two engagement members engage with each other with the difference in the rotation speed present therebetween, and performs a control to allow the direct engagement state on condition of being in the synchronization state in which the difference in the rotation speed between the two engagement members is less than the differential rotation threshold value.

19. The driving device for a vehicle according to claim 2, the second rotating electrical machine is connected in a driving manner to the rotational element, to which the output member is connected in a driving manner, of the differential gear unit, not through another rotational element of the differential gear unit.

20. The driving device for a vehicle according to claim 2, wherein the differential gear unit includes three rotational elements that are a first rotational element, a second rotational element, and a third rotational element in the order of rotation speed, the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

* * * * *